United States Patent
Hozumi

(10) Patent No.: US 8,560,171 B2
(45) Date of Patent: Oct. 15, 2013

(54) DAMPING FORCE CONTROLLER

(75) Inventor: Jin Hozumi, Shizuoka-ken (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/142,219

(22) PCT Filed: Dec. 25, 2008

(86) PCT No.: PCT/JP2008/073944
§ 371 (c)(1),
(2), (4) Date: Jun. 24, 2011

(87) PCT Pub. No.: WO2010/073412
PCT Pub. Date: Jul. 1, 2010

(65) Prior Publication Data
US 2012/0004806 A1    Jan. 5, 2012

(51) Int. Cl.
*B60G 17/018* (2006.01)
(52) U.S. Cl.
USPC ............... 701/37; 701/38; 701/39; 318/629; 318/616; 700/30; 700/31; 280/5.515
(58) Field of Classification Search
USPC ............. 701/1, 36, 37, 41, 44, 51, 84, 38, 59; 700/280, 29; 290/40 C; 702/142; 318/629, 616
See application file for complete search history.

(56) References Cited

U.S. PATENT DOCUMENTS

| | | | |
|---|---|---|---|
| 5,794,168 A * | 8/1998 | Sasaki et al. | 701/37 |
| 5,832,398 A * | 11/1998 | Sasaki et al. | 701/37 |
| 6,314,353 B1 * | 11/2001 | Ohsaku et al. | 701/37 |
| 6,366,841 B1 | 4/2002 | Ohsaku | |
| 2005/0071060 A1 * | 3/2005 | Lauwerys et al. | 701/37 |
| 2009/0234536 A1 * | 9/2009 | Gopalakrishnan et al. | 701/37 |

FOREIGN PATENT DOCUMENTS

| | | |
|---|---|---|
| DE | 100 19 763 A1 | 11/2000 |
| FR | 2 794 068 A1 | 12/2000 |
| JP | 3-246112 | 11/1991 |
| JP | 6-34474 | 2/1994 |
| JP | 2001-1736 | 1/2001 |
| JP | 2008-115966 | 5/2008 |

OTHER PUBLICATIONS

Ohsaku, S. et al., "Nonlinear H∞ State Feedback Controller for Semi-Active Controlled Suspension," Toyota Motor Corporation, Avec '98, 1998, pp. 63-68.

(Continued)

*Primary Examiner* — Tuan C. To
*Assistant Examiner* — Jelani Smith
(74) *Attorney, Agent, or Firm* — Finnegan, Henderson, Farabow, Garrett & Dunner, LLP

(57) ABSTRACT

The damping force of a damping force generation apparatus is controlled by operating an actuator on the basis of a control input u calculated by a state feedback controller K designed such that an $L_2$ gain of a closed loop control system S which includes a generalized plant G designed by making use of a delay-approximated model M and the state feedback controller K therefor becomes less than a previously set positive constant γ. The delay-approximated model M is designed such that a delay element R representing operation delay of the actuator and a delay compensation element R* cancelling out the delay act on a mechanical motion model of the damping force generation apparatus. The delay-approximated model M is a bilinear system, and is designed to approximate a delay-considered model which is a control model designed on the basis of the mechanical motion model of the damping force generation apparatus and in consideration of the delay.

7 Claims, 11 Drawing Sheets

(56) References Cited

OTHER PUBLICATIONS

International Search Report in International Application No. PCT/JP2008/073944; Mailing Date: Feb. 17, 2009.
Extended European Search Report for EP Appl. No. 08879207.2 dated Jun. 21, 2012.
Xuan, D et al., "A Study on Active Suspension System Using Time Delay Control," International Conference on Control, Automation and Systems, Oct. 17-20, 2007, pp. 388-393.
Lin, C. et al., "Stable Design of $H_\infty$ Output FeedBack Control Systems With Time Delay," 13$^{th}$ World Conference on Earthquake Engineering, Aug. 1-6, 2004.
Lei, J., et al., "Optimal Vibration Control for Active Suspension Sampled-Data Systems with Actuator and Sensor Delays," 10$^{th}$ Intl. Conf. on Control, Automation, Robotics and Vision, Dec. 17-20, 2008, pp. 988-993.
Carr, S., et al., "Robust controller design for time delay systems using H-infinity techniques," Dublin Institute of Technology, Jan. 1, 1999, pp. 45-52.
US 6,243,631, 06/2001, Ohsaku (withdrawn)

\* cited by examiner

CLOSED LOOP CONTROL SYSTEM S

DAMPING FORCE CONTROLLER

CROSS-REFERENCE TO RELATED APPLICATIONS

This application is a national phase application of International Application No. PCT/JP2008/073944, filed Dec. 25, 2008, the content of which is incorporated herein by reference.

TECHNICAL FIELD

The present invention relates to a damping force controller for controlling damping force. The present invention is applied to, for example, a damping force controller which controls damping force of a suspension apparatus of a vehicle.

BACKGROUND ART

A suspension apparatus for a vehicle includes a suspension spring, and a damper interposed between a sprung member and an unsprung member. The damper damps vibrations of the sprung member and the unsprung member generated, for example, when the vehicle travels over an uneven portion of a road surface. The suspension spring absorbs (buffers) the above-mentioned vibrations. That is, the suspension apparatus absorbs (buffers) externally input vibrations, and serves as a damping force generation apparatus which generates damping force so as to damp the vibrations.

There has been known a suspension apparatus which includes a damper capable of changing its damping force characteristic in accordance with the traveling state of a vehicle. The damping force characteristic of such a damper is variably controlled by an actuator which operates in accordance with a control input calculated by a feedback controller designed on the basis of a predetermined control theory.

When the damping force characteristic of the damper is variably controlled, a nonlinear H-infinity control theory is applied as a control theory for calculating the magnitude of a variable portion of the damping force such that riding quality is improved. For example, Japanese Patent Application Laid-Open (kokai) No. 2001-1736 discloses a damping force controller which utilizes a closed loop control system which includes a generalized plant designed through addition of a nonlinear weight to a mechanical motion model representing an equation of motion of a suspension apparatus, and a state feedback controller for the generalized plant. The state feedback controller is designed to solve a nonlinear H-infinity control problem; i.e., is designed such that the $L_2$ gain of the closed loop control system becomes less than a positive constant $\gamma$. In the damping force controller, a variable damping coefficient is calculated on the basis of a control input obtained by the state feedback controller designed in the above-described manner.

DISCLOSURE OF THE INVENTION

In general, a damping force controller controls damping force of a damping force generation apparatus by operating an actuator on the basis of a control input calculated by a feedback controller of a closed loop control system for damping force control. In such a case, the actuator needs a certain period of time (operation time) to complete its operation after the start thereof. This delay corresponding to the operation time brings about a situation where a control input obtained from the feedback controller does not coincide with a control input required when the operation of the actuator ends. As described above, delay in operation of the actuator causes deviation of control timing. That is, delay in operation of the actuator adversely affects the damping force control performed on the basis of the control input supplied from the feedback controller.

Such delay in operation of the actuator can be reduced by means of enhancing the responsiveness of the actuator. However, enhancing the responsiveness of the actuator results in generation of noise. That is, in the case where the responsiveness of the actuator is merely enhanced so as to reduce adverse effects caused by the delay as much as possible, another problem arises.

If the feedback controller of the closed loop control system can be designed by making use of a control model designed on the basis of a mechanical motion model of the damping force generation apparatus and in consideration of delay in operation of the actuator (in the present specification, such a model will be referred to as a "delay-considered model"), there can be obtained from the feedback controller a control input determined in consideration of delay in operation of the actuator; i.e., a control input corrected for deviation of control timing caused by the delay in operation. Accordingly, by means of controlling the damping force on the basis of the control input obtained from the feedback controller designed as described above, there can be performed damping force control which is free from adverse effects caused by the delay.

However, when the damping force of the damping force generation apparatus is controlled by making use of the nonlinear H-infinity control theory, the control model must be a bilinear system for the following reason. In the case where the control model is a bilinear system, the feedback controller can be designed by obtaining an approximate solution of a Riccati inequality. However, in the case where the control model is a nonlinear system which is not bilinear, the solution of a Hamilton-Jacobi partial differential inequality must be obtained. Analytically obtaining this solution is said to be almost impossible. The above-described delay-considered model is nonlinear and is not bilinear. Therefore, the delay-considered model cannot be used as a control mode in the case where the damping force is controlled through application of the nonlinear H-infinity control theory. Therefore, damping force control cannot be performed in consideration of operation delay of the actuator.

The present invention has been accomplished in order to solve the above-described problem, and its object is to provide a damping force controller which can perform damping force control which is free from adverse effects such as deviation (lag) of control timing caused by operation delay of an actuator.

The present invention provides a damping force controller which controls damping force generated by a damping force generation apparatus against externally input vibration by operating an actuator. The damping force controller comprises control input calculation means and operation control means. The control input calculation means calculates a control input u by use of a state feedback controller K designed such that an $L_2$ gain of a closed loop control system S including a generalized plant G and the state feedback controller K for the generalized plant G becomes less than a previously set positive constant $\gamma$. The generalized plant G is designed by making use of a delay-approximated model M which is a control model in which a delay element R representing operation delay of the actuator and a delay compensation element R* cancelling out the delay act on a mechanical motion model of the damping force generation apparatus. The delay-approximated model M is a bilinear system, and is designed to approximate a control model designed on the basis of the mechanical motion model of the damping force generation apparatus and in consideration of the delay. The operation control means controls the operation of the actuator on the basis of the control input u calculated by the control input calculation means. In this case, preferably, the control input u is a variable damping coefficient C. This variable damping coefficient $C_v$ is a damping coefficient which changes as a result of control, and is represented by a gradient of change in the magnitude of a variable portion of the damping force with speed dr/dt-dy/dt of the externally input vibration.

According to the present invention, the delay-approximated model M used for designing of the generalized plant is a control model in which a delay element R representing operation delay of the actuator and a delay compensation element R* cancelling out the delay act on a mechanical motion model of the damping force generation apparatus. That is, the delay-approximated model M is a control model represented by a block diagram obtained by adding the delay element R representing operation delay of the actuator and the delay compensation element R* cancelling out the delay to a block diagram representing the mechanical motion model of the damping force generation apparatus. Since this delay-approximated model M is configured to operate as a bilinear system, the generalized plant G designed by making use of the delay-approximated model M also becomes a bilinear system. Therefore, by solving the Riccati inequality, the state feedback controller K can be designed such that the $L_2$ gain of the closed loop control system S becomes less than a predetermined positive constant γ.

Furthermore, the delay-approximated model M approximates a delay-considered model, which is a control model designed on the basis of the mechanical motion model of the damping force generation apparatus and in consideration of delay of the actuator. Therefore, the control input u provided by the state feedback controller K of the closed loop control system S designed by making use of the delay-approximated model M is one determined in consideration of operation delay of the actuator. That is, the control input u is calculated as a control input corrected for deviation (lag) of control timing caused by operation delay of the actuator. Therefore, when the actuator is operated on the basis of the control input u calculated in this manner, the actuator operates to eliminate its own delay. With this operation, the deviation of control timing caused by operation delay of the actuator is eliminated. That is, according to the damping force controller of the present invention, there can be performed damping force control which is free from adverse effects caused by, for example, deviation of control timing caused by operation delay of the actuator.

The above-described delay compensation element R* is an element for cancelling operation delay of the actuator. The expression "cancelling operation delay of the actuator" means that, when the delay element R representing operation delay of the actuator and the delay compensation element R* are multiplied together, the action of the delay element R is cancelled out. Specifically, in the case where the delay element R is represented by a certain transfer function, the delay compensation element R* is represented by a transfer function determined such that, when the transfer function of the delay compensation element R* and that of the delay element R are multiplied together, the output becomes 1.

The above-described bilinear system refers to a control system designed such that, when the generalized plant or the control model is transformed to a state space representation, a matrix by which state quantities are multiplied is a constant matrix, and a matrix by which the control input is multiplied is represented by a function of the state quantities.

The "control model designed to approximate a delay-considered model" refers to a control model which is equivalent to the delay-considered model or designed such that it can be considered to be equivalent to the delay-considered mode, although the control mode partially differs from the delay-considered model in terms of configuration. For example, a control model—in which the damping force to be controlled by the damping force controller is expressed by the same form as the damping force expressed in the delay-considered model when the variable damping force $F_v$, which represents the magnitude of a variable portion of the damping force to be controlled by the damping force controller, is expressed by the control input and the state quantities—is a control model designed to approximate the delay-considered model. In this case, the delay-approximated model is not necessarily required to approximate the delay-considered model at all times, and may be configured to approximate the delay-considered model when a predetermined condition is satisfied.

Preferably, the delay-approximated model M is designed such that the above-mentioned delay compensation element R* acts on the above-mentioned speed dr/dt-dy/dt, its output is multiplied by the control input u, and the delay element R acts on the result of the multiplication. That is, when the delay-approximated model M is represented by a block diagram, the delay compensation element R* acts on a portion which represents the speed dr/dt-dy/dt, and its output is multiplied by the control input u. The delay element R acts on the result of the multiplication. Since the delay-approximated model M is designed in this manner, the delay-approximated model M becomes a bilinear system.

Further, since the delay-approximated model M is designed in the above-described manner, the form of the variable damping force $F_v$ represented in the delay-approximated model M and the form of the variable damping force $F_v$ represented in the delay-considered model coincide with each other under the condition that the speed dr/dt-dy/dt or the control input u is constant. Therefore, when the change amount Δv of the speed dr/dt-dy/dt or the change amount Δu of the control input u is equal to or less than a previously set very small amount, the delay-approximated model M becomes a control model equivalent to the delay-considered model or a control model which can be considered to be equivalent to the delay-considered model. That is, the delay-approximated model becomes a control model approximate to the delay-considered model.

Therefore, in the case where each of the change amount Δv of the speed dr/dt-dy/dt or the change amount Δu of the control quantity u is equal to or less than a previously set very small amount, by means of controlling the damping force by operating the actuator on the basis of the control input u calculated by the state feedback controller K for the generalized plant G designed on the basis of the bilinear delay-approximated model M, there can be performed optimal damping force control from which adverse effects such as deviation of control timing caused by operation delay of the actuator are removed sufficiently. Notably, in this case, preferably, the generalized plant G is designed such that the state quantities x thereof include the speed dr/dt-dy/dt and the variable damping force $F_v$, and the control input u is the variable damping coefficient $C_v$.

A designer can arbitrarily set the change amount Δv of the speed dr/dt-dy/dt and the change amount Δu of the control input u within respective ranges in which the delay-approximated model M approximates the delay-considered model. Since the specific ranges of these change amounts change depending on a control model to be handled and the magnitude of the delay, the ranges cannot be determined unconditionally. For example, when the upper limit of the absolute value |Δv| of the change amount of the speed is 0.05 to 0.5 m/s, the present invention can be applied. Also, when the upper limit of the absolute value |Δu| of the change amount Δu of the control input u is 100 to 400 N·S/m, the present invention can be applied. Needless to say, the change amount of the speed or the control input is not necessarily required to fall within the above-described range insofar as the delay-approximated model becomes a control model sufficiently approximate to the delay-considered model.

The above-mentioned delay element R may be a first-order delay element represented by the following equation 1, and the above-mentioned delay compensation element R* may be one represented by the following equation 2.

$$R = \frac{1}{\tau s + 1} \quad \text{(eq. 1)}$$

$$R^* = \tau s + 1 \quad \text{(eq. 2)}$$

(τ represents a time constant; s represents a Laplace operator)

In this case, the damping force is controlled on the basis of the control input calculated in such a manner that deviation of control timing caused by first-order delay of the actuator is eliminated.

Preferably, the above-mentioned damping force generation apparatus is a suspension apparatus which is disposed between a sprung member and an unsprung member of a vehicle, and which includes a damper for damping vibration of the sprung member in relation to the unsprung member, and an elastic member for absorbing the vibration. In this case, the damping force controller variably controls the damping force characteristic of the damper by operating the actuator on the basis of the control input u calculated by the state feedback controller K, to thereby control the damping force of the damping force generation apparatus such that the vibration of the sprung member is restrained. In this case, preferably, the state space representation of the delay-approximated model M is expressed by the following equation 3.

$$\begin{bmatrix} \dot{r} - \dot{y} \\ \ddot{y} \\ \dot{x}_\tau \end{bmatrix} = \begin{bmatrix} 0 & -1 & 0 \\ K_s/M & -C_s/M & 1/M \\ 0 & 0 & -1/\tau \end{bmatrix} \begin{bmatrix} r-y \\ \dot{y} \\ x_\tau \end{bmatrix} + \quad \text{(eq. 3)}$$

$$\begin{bmatrix} 1 \\ C_s/M \\ 0 \end{bmatrix} \dot{r} + \begin{bmatrix} 0 \\ 0 \\ \{\tau(\ddot{r} - \ddot{y}) + (\dot{r} - \dot{y})\}/\tau \end{bmatrix} u$$

wherein $\dot{r}-\dot{y}$ represents sprung-unsprung relative speed; $\ddot{y}$ represents sprung member acceleration; $\dot{x}_t$ represents the differentiated value of variable damping force; r–y represents sprung-unsprung relative displacement; $\dot{y}$ represents sprung member speed; $x_t$ represents the variable damping force; $\ddot{r}-\ddot{y}$ represents sprung-unsprung relative acceleration; $\dot{r}$ represents unsprung member speed; u represents the control input; $K_s$ represents the elastic coefficient (spring constant) of an elastic member (e.g., a spring); M represents the mass of the sprung member; $C_s$ represents a linear damping coefficient; and t(τ) represents a time constant. In this case, the damping force controller of the present invention is applied to the suspension apparatus, and the damping force control is performed on the basis of the control input corrected for deviation of control timing caused by operation delay of the actuator. Therefore, the riding quality of the vehicle can be improved.

The present invention also provides a damping force control method for controlling damping force generated by a damping force generation apparatus against externally input vibration by operating an actuator. The damping force control method comprises the steps of:

designing a state feedback controller K such that the $L_2$ gain of a closed loop control system S including a generalized plant G and the state feedback controller K for the generalized plant G becomes less than a previously set positive constant γ, the generalized plant G being designed by making use of a delay-approximated model M which is a control model in which a delay element R representing operation delay of the actuator and a delay compensation element R* cancelling out the delay act on a mechanical motion model of the damping force generation apparatus, which is a bilinear system, and which is designed to approximate a control model designed on the basis of the mechanical motion model of the damping force generation apparatus and in consideration of the delay;

calculating a control input u by use of the designed state feedback controller K; and operating the actuator on the basis of the calculated control input u.

In this case, preferably, the control input u is the variable damping coefficient $C_v$, which represents the gradient of change in the magnitude of a variable portion of the damping force with the speed dr/dt-dy/dt of the externally input vibration. Also, preferably, the delay-approximated model M is designed such that the delay compensation element R* acts on the speed dr/dt-dy/dt, its output is multiplied by the control input u, and the delay element R acts on the result of the multiplication. Moreover, preferably, the delay-approximated model M is designed such that the delay-approximated model M approximates the delay-considered model when the change amount of the speed dr/dt-dy/dt or the change amount of the control input u is equal to or less than a previously set very small amount.

Such a method invention provides actions and effects similar to those achieved by the above-described invention regarding the damping force controller.

BEST MODE FOR CARRYING OUT THE INVENTION

One embodiment in which a damping force controller of the present invention is applied to a suspension apparatus of a vehicle will now be described with reference to the drawings.
[Configuration of Suspension Control Apparatus]

Figure 1:
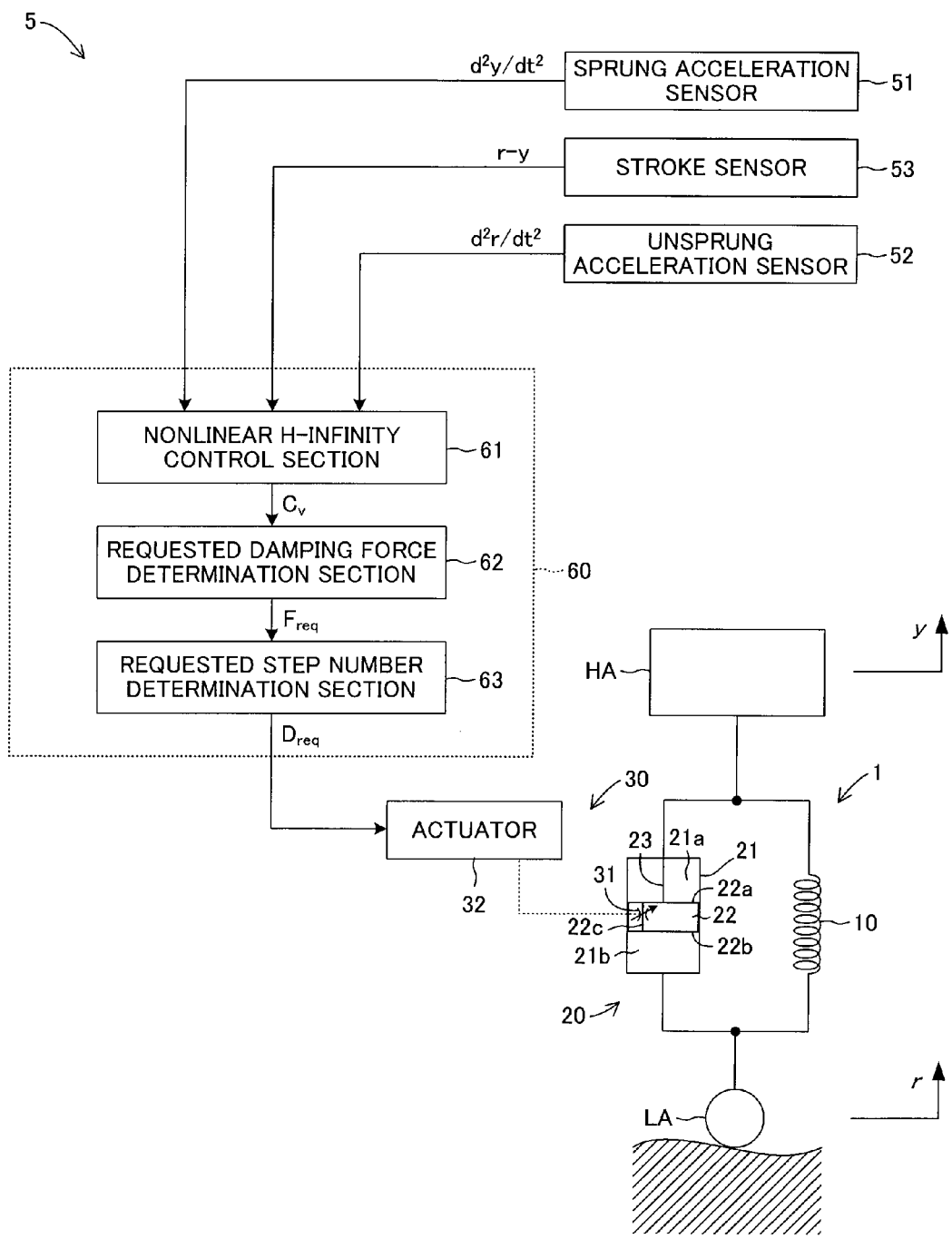
FIG. 1 is an overall schematic diagram of a suspension control apparatus for a vehicle according to one embodiment of the present invention.

FIG. 1 is an overall schematic diagram of a suspension control apparatus for a vehicle according to the present embodiment. This suspension control apparatus includes a suspension apparatus 1 and an electric control apparatus 5.

The suspension apparatus 1 corresponds to the damping force generation apparatus of the present invention, and includes a suspension spring 10 and a damper 20. The suspension spring 10 and the damper 20 are disposed between a sprung member HA and an unsprung member LA of a vehicle. First ends (lower ends) of the suspension spring 10 and the damper 20 are connected to the unsprung member LA, and second ends (upper ends) thereof are connected to the sprung member HA. The suspension spring 10 corresponds to the elastic member of the present invention, and absorbs (buffers) vibrations of the unsprung member LA and the sprung member HA. The damper 20 is disposed in parallel with the suspension spring 10, and damps vibration of the sprung member HA in relation to the unsprung member LA. Notably, a knuckle connected to a wheel, a lower arm whose one end is connected to the knuckle, etc. correspond to the unsprung member LA. The sprung member HA is a member supported by the suspension spring 10 and the damper 20, and the vehicle body is a portion of the sprung member HA.

The damper 20 includes a cylinder 21, a piston 22, and a piston rod 23. The cylinder 21 is a hollow member filled with a viscous fluid such as oil. The lower end of the cylinder 21 is connected to the lower arm, which is a portion of the unsprung member LA. The piston 22 is disposed within the cylinder 21, and is configured to be axially movable within the cylinder 21. The piston rod 23 is a rodlike member. The piston rod 23 is connected at one end to the piston 22, extends upward from the connected end along the axial direction of the cylinder 21, and projects from the upper end of the cylinder 21. The other end of the piston rod 23 is connected to the vehicle body, which is a portion of the sprung member HA.

As shown in the drawing, the piston 22 disposed within the cylinder 21 defines an upper chamber 21a and a lower chamber 21b within the cylinder 21. Also, the piston 22 has a communication passage 22c formed therein. This communication passage 22c is opened at an upper surface 22a facing the upper chamber 21a and at a lower surface 22b facing the lower chamber 21b, to thereby establish communication between the upper chamber 21a and the lower chamber 21b.

The damper 20 having the above-described structure operates as follows. When vibration of the unsprung member LA generated as a result of the vehicle traveling over an uneven portion of a road surface is transmitted to the sprung member HA via the suspension spring 10 and the damper 20, the sprung member HA vibrates vertically in relation to the unsprung member LA. In such a case, the piston 22 connected to the sprung member HA via the piston rod 23 relatively moves in the axial direction within the cylinder 21 connected to the unsprung member LA. As a result of this relative movement, the viscous fluid flows through the communication passage 22c. Viscous resistance which is generated when the viscous fluid flows through the communication passage serves as damping force against the vertical vibration, thereby damping the vibration of the sprung member HA (the piston 22 side) in relation to the unsprung member LA (the cylinder 21 side). Notably, the greater the vibration speed of the piston 22 in relation to the cylinder 21 (this speed is a sprung-unsprung relative speed $dr/dt-dy/dt$, which will be described later), the greater the magnitude of the damping force.

Furthermore, the suspension apparatus 1 includes a variable throttle mechanism 30. The variable throttle mechanism 30 includes a valve 31 and an actuator 32. The valve 31 is provided in the communication passage 22c formed in the piston 22. When operated, the valve 31 changes the channel sectional area of at least portion of the communication passage 22c. Alternatively, in the case where the communication passage 22c is composed of a plurality of connection channels, the valve 31 may change the number of connection channels which connect the upper and lower chambers. That is, the valve 31 changes the opening OP of the communication passage 22c. The valve 31 may be a rotary valve provided in the communication passage 22c. By means of changing the rotational angle of the rotary valve, the channel sectional area of the communication passage 22c or the number of connection channels of the communication passage 22c which connect the upper and lower chambers can be changed, whereby the opening OP can be changed. The actuator 32 is connected to the valve 31. This actuator 32 operates the valve 31. In the case where the valve 31 is a rotary valve as described above, the actuator 32 may be a motor for rotating the rotary valve.

When the opening OP is changed as a result of the valve 31 being operated by the actuator 32, the magnitude of the resistance which acts on the viscous fluid flowing through the communication passage 22c changes. As described above, this resistance serves as damping force against vibration. Therefore, when the opening OP is changed, the damping force characteristic of the damper 20 changes. Notably, the damping force characteristic refers to a characteristic which determines change in the magnitude of damping force with speed of the piston 22 in relation to the cylinder 21 (i.e., sprung-unsprung relative speed to be described later). In the case where the damping force is proportional to the speed, the damping force characteristic is represented by a damping coefficient.

Furthermore, in the present embodiment, the opening OP is set stepwise. Therefore, changing of the opening OP results in a stepwise change in the damping force characteristic of the damper 20. The damping force characteristic is represented by the set step number of the opening OP. That is, the damping force characteristic is displayed in the form of step number (e.g., first step, second step, etc.) in accordance with the set step number of the opening OP. In this case, each step number representing a damping force characteristic can be set such that the greater the numeral representing the step number, the greater the damping force produced for a certain speed of the piston 22 (for a certain sprung-unsprung relative speed). As described above, the set step number that represents the damping force characteristic is changed through operation of the variable throttle mechanism 30. That is, the variable throttle mechanism 30 serves as damping-force-characteristic changing means for changing the damping force characteristic.

Next, the electric control apparatus 5 will be described. The electric control apparatus 5 includes a sprung acceleration sensor 51, an unsprung acceleration sensor 52, a stroke sensor 53, and a microcomputer 60. The sprung acceleration sensor 51, which is attached to the vehicle body, detects sprung member acceleration $d^2y/dt^2$, which is vertical acceleration of the sprung member HA in relation to the absolute space, and outputs a signal representing the detected sprung member acceleration $d^2y/dt^2$. The unsprung acceleration sensor 52, which is fixed to the unsprung member LA, detects unsprung member acceleration $d^2r/dt^2$, which is vertical acceleration of the unsprung member LA in relation to the absolute space, and outputs a signal representing the detected unsprung member acceleration $d^2r/dt^2$. The stroke sensor 53, which is disposed between the sprung member HA and the unsprung member LA, detects sprung-unsprung relative displacement r−y, and outputs a signal representing the detected sprung-unsprung relative displacement r−y. The sprung-unsprung relative displacement r−y is the difference between sprung member displacement y, which is vertical displacement of the sprung member HA from a reference position, and unsprung member displacement r, which is vertical displacement of the unsprung member LA from a reference position. Notably, in the present embodiment, the vertical displacement of the unsprung member LA is assumed to be equal to the vertical displacement of a road surface. Accordingly, the unsprung member displacement r also represents the displacement of the road surface.

Notably, each of the sprung acceleration sensor 51 and the unsprung acceleration sensor 52 detects upward acceleration as positive acceleration, and downward acceleration as negative acceleration. The stroke sensor 53 detects the relative displacement for the case where upward displacement of the sprung member HA from the reference position is detected as positive sprung member displacement, downward displacement of the sprung member HA from the reference position is detected as negative sprung member displacement, upward displacement of the unsprung member LA from the reference position is detected as positive unsprung member displacement, and downward displacement of the unsprung member LA from the reference position is detected as negative unsprung member displacement.

The microcomputer 60 is electrically connected to the sprung acceleration sensor 51, the unsprung acceleration sensor 52, and the stroke sensor 53, and determines a requested step number $D_{req}$, which represents a target step number corresponding to a target damping force characteristic, on the basis of the signals output from the sensors. Subsequently, the microcomputer 60 outputs to the actuator 32 an instruction signal corresponding to the determined requested step number $D_{req}$. The actuator 32 operates in accordance with the instruction signal. Thus, the valve 31 operates. In this manner, the microcomputer 60 variously controls the damping force characteristic of the damper 20 by controlling the variable throttle mechanism 30, to thereby control the damping force of the suspension apparatus 1. That is, the microcomputer 60 corresponds to the damping force controller of the present invention.

Furthermore, as can be understood from FIG. 1, the microcomputer 60 includes a nonlinear H-infinity control section 61, a requested damping force determination section 62, and a requested step number determination section 63. The nonlinear H-infinity control section 61 acquires signals from the sensors 51, 52, 53, and calculates a variable damping coefficient $C_v$, which is a variable portion of the entire damping coefficient to be controlled, on the basis of the nonlinear H-infinity control theory. The nonlinear H-infinity control section 61 outputs the calculated variable damping coefficient $C_v$. The requested damping force determination section 62 acquires the variable damping coefficient $C_v$, and calculates a requested damping force $F_{req}$, which is a damping force required for control, on the basis of a requested damping coefficient $C_{req}$ obtained through addition of the acquired variable damping coefficient $C_v$ and a linear damping coefficient $C_s$ set in advance. The requested damping force determination section 62 outputs the calculated requested damping force $F_{req}$. The requested step number determination section 63 acquires the requested damping force $F_{req}$, and determines the requested step number $D_{req}$, which represents the target step number corresponding to the target damping force characteristic, on the basis of the acquired requested damping force $F_{req}$. The requested step number determination section 63 outputs to the actuator 32 a signal (instruction signal) corresponding to the determined requested step number $D_{req}$.

[Damping Force Control for Suspension Apparatus]

The suspension control apparatus of the present embodiment having the above-described configuration operates as follows. When an ignition switch of the vehicle is turned on, the microcomputer 60 repeatedly executes various processings at respective short intervals. Specifically, the microcomputer 60 performs variable-damping-coefficient calculation processing at the nonlinear H-infinity control section 61, requested-damping-force determination processing at the requested damping force determination section 62, and requested-step-number determination processing at the requested step number determination section 63.

Figure 2:
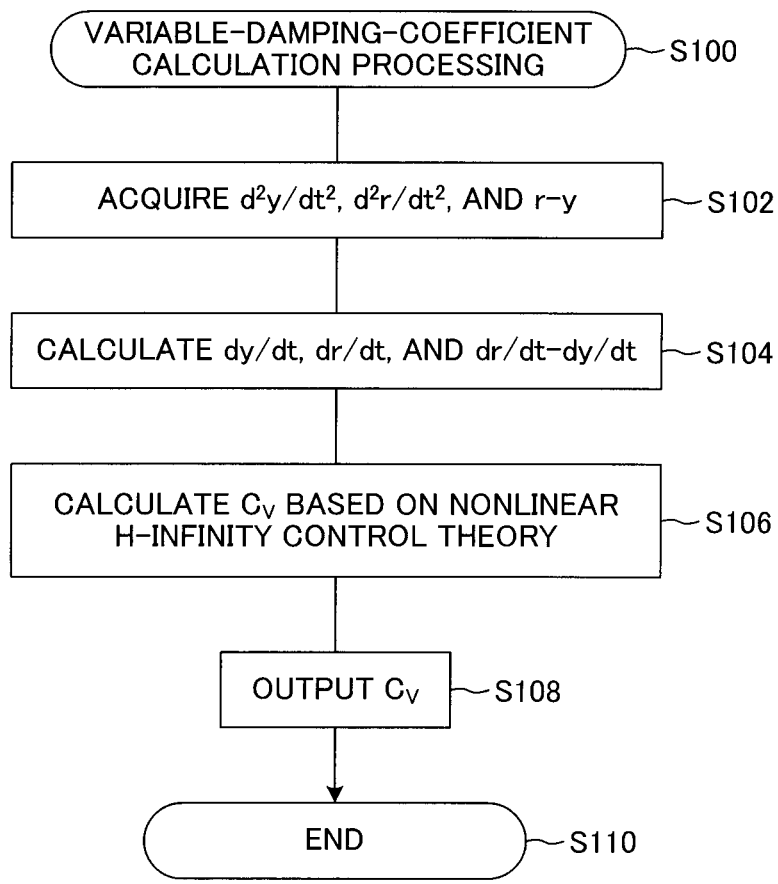
FIG. 2 is a flowchart showing the flow of variable-damping-coefficient calculation processing executed by a microcomputer at a nonlinear H-infinity control section.

FIG. 2 is a flowchart showing the flow of the variable-damping-coefficient calculation processing executed by the microcomputer 60 at the nonlinear H-infinity control section 61. The microcomputer 60 starts this processing in step 100 of FIG. 2 (hereinafter, step is abbreviated to S). In S102 subsequent thereto, the microcomputer 60 acquires the sprung member acceleration $d^2y/dt^2$ from the sprung acceleration sensor 51, the unsprung member acceleration $d^2r/dt^2$ from the unsprung acceleration sensor 52, and the sprung-unsprung relative displacement r−y from the stroke sensor 53. Next, in S104, the microcomputer 60 integrates the sprung member acceleration $d^2y/dt^2$ and the unsprung member acceleration $d^2r/dt^2$ with time, to thereby obtain a sprung member speed dy/dt, which is a vertical speed of the sprung member HA, and an unsprung member speed dr/dt, which is a vertical speed of the unsprung member LA. Further, the microcomputer 60 differentiates the acquired sprung-unsprung relative displacement r−y with time so as to obtain the sprung-unsprung relative speed dr/dt-dy/dt, which is the difference between the sprung member speed dy/dt and the unsprung member speed dr/dt. Each of the sprung member speed dy/dt and the unsprung member speed dr/dt is calculated as a positive speed when it is a speed in the upward direction, and is calculated as a negative speed when it is a speed in the downward direction. Further, the relative speed dr/dt-dy/dt is calculated as a positive speed in the case where the spacing between the sprung member HA and the unsprung member LA decreases; that is, the damper 20 contracts, and is calculated as a negative speed in the case where the spacing increases; that is, the damper 20 expands. Notably, the sprung-unsprung relative speed dr/dt-dy/dt represents the speed of external vibration applied to the suspension apparatus 1, and is equal to the above-described speed of the piston 22 in relation to the cylinder 21.

Next, in S106, the microcomputer 60 calculates the variable damping coefficient $C_v$ on the basis of the nonlinear H-infinity control theory. The variable damping coefficient $C_v$ represents a variable portion of the entire damping coefficient, which portion changes as a result of damping force control. In this case, as will be described in detail later, the variable damping coefficient $C_v$ is calculated, as a control input u, by a state feedback controller K designed such that the $L_2$ gain of a closed loop control system S composed of a generalized plant G and the state feedback controller K becomes less than a positive constant γ. That is, the nonlinear H-infinity control section 61, which includes the processing of this S106, corresponds to the control input calculation means of the present invention. After having calculated the variable damping coefficient $C_v$ in S106, the microcomputer 60 outputs the variable damping coefficient $C_v$ in S108. After that, the microcomputer 60 proceeds to S110 so as to end this processing.

Figure 3:
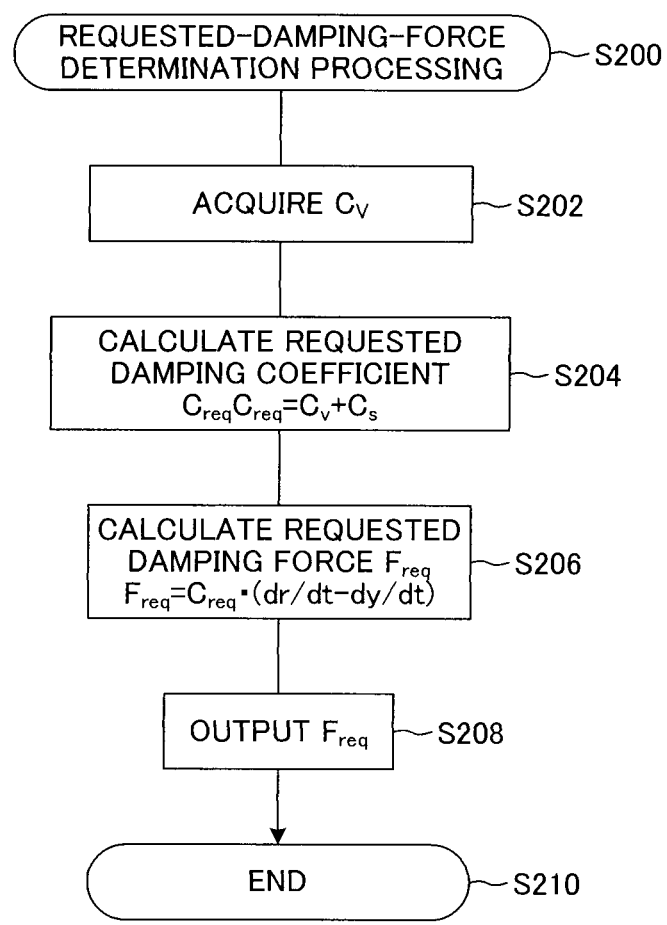
FIG. 3 is a flowchart showing the flow of requested-damping-force determination processing executed by the microcomputer at a requested damping force determination section.

FIG. 3 is a flowchart showing the flow of the requested-damping-force determination processing executed by the microcomputer 60 at the requested damping force determination section 62. The microcomputer 60 starts this processing in S200 of FIG. 3, and acquires the variable damping coefficient $C_v$ in S202 subsequent thereto. Next, the microcomputer 60 calculates the requested damping coefficient $C_{req}$ in S204. The requested damping coefficient $C_{req}$ is obtained by adding the previously set linear damping coefficient $C_s$ to the variable damping coefficient $C_v$. This linear damping coefficient $C_s$ represents a fixed portion (linear portion) of the entire damping coefficient, which portion does not change irrespective of the damping force control. Subsequently, the microcomputer 60 calculates the requested damping force $F_{req}$ in S206. The requested damping force $F_{req}$ is obtained by multiplying the calculated requested damping coefficient $C_{req}$ by the sprung-unsprung relative speed dr/dt-dy/dt. Next, the microcomputer 60 outputs the requested damping force $F_{req}$ in S208, and then proceeds to S210 so as to end this processing.

Figure 4:
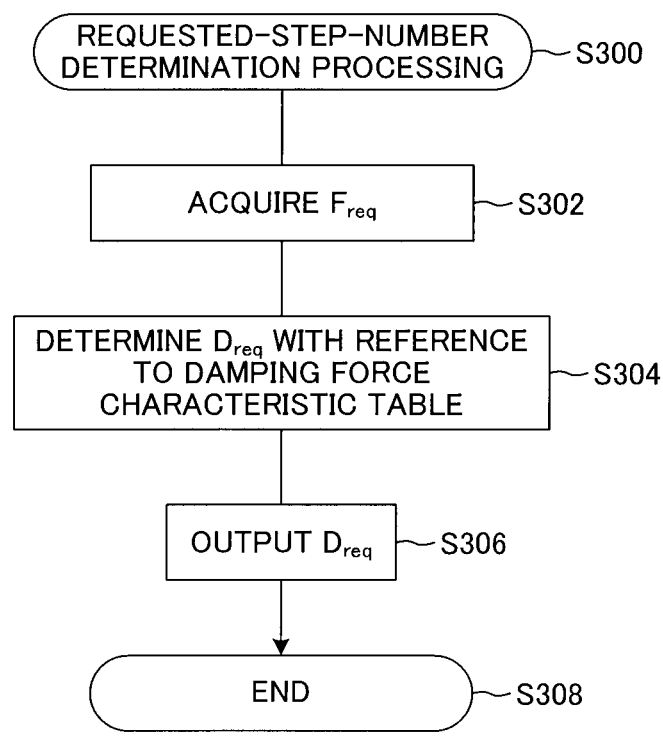
FIG. 4 is a flowchart showing the flow of requested-step-number determination processing executed by the microcomputer at a requested step number determination section.

FIG. 4 is a flowchart showing the flow of the requested-step-number determination processing executed by the microcomputer 60 at the requested step number determination section 63. The microcomputer 60 starts this processing in S300 of FIG. 4, and acquires the requested damping force $F_{req}$ in S302 subsequent thereto. Next, the microcomputer 60 determines the requested step number $D_{req}$ in S304. Notably, the microcomputer 60 has a damping force characteristic table which stores, for each of step numbers corresponding to different damping force characteristics, the magnitude of damping force which the damper 20 can generate for a plurality of sprung-unsprung relative speeds dr/dt-dy/dt. In S304, the microcomputer 60 determines the requested step number $D_{req}$ with reference to the damping force characteristic table. Specifically, in S304, for each of step numbers, the microcomputer 60 selects a damping force corresponding to the acquired relative speed dr/dt-dy/dt, among the damping forces stored in the damping force characteristic table. The microcomputer 60 determines, as the requested step number $D_{req}$, a step number which corresponds to a damping force which is one of the selected damping forces and is closest to the requested damping force $F_{req}$ acquired in S302.

After having determined the requested step number $D_{req}$ in S304, the microcomputer 60 proceeds to S306, and outputs to the actuator 32 an instruction signal corresponding to the requested step number $D_{req}$. Upon receipt of the instruction signal, the actuator 32 operates in accordance with the instruction signal. As a result, the valve 31 operates, whereby the variable throttle mechanism 30 is controlled such that the set step number of the damper 20, which determines the damping force characteristic thereof, coincides with the requested step number $D_{req}$. After that, the microcomputer 60 proceeds to S308 so as to end this processing.

The damping force characteristic of the damper 20 is variably controlled by means of controlling the variable throttle mechanism 30 in the above-described manner. With this operation, the damping force of the suspension apparatus 1 is controlled. Notably, the requested damping force determination section 62 and the requested step number determination section 63 correspond to the operation control means for controlling operation of the actuator 32 on the basis of the variable damping coefficient C, calculated as the control input u.

[Control Theory for Variable Damping Coefficient $C_v$]

The variable damping coefficient $C_v$ is calculated in S106 of the variable-damping-coefficient calculation processing. The variable damping coefficient $C_v$ represents a variable portion of the entire damping coefficient, which portion changes as a result of control. That is, the variable damping coefficient $C_v$ represents the gradient of changing of the magnitude of the variable portion of the entire damping force (the variable damping force $F_v$) for the sprung-unsprung relative speed dr/dt-dy/dt. The product of the variable damping coefficient $C_v$ and the sprung-unsprung relative speed dr/dt-dy/dt corresponds to the variable damping force F. Whether the riding quality of the vehicle is good or bad is determined by a manner in which an ideal variable damping coefficient $C_v$ is calculated in accordance with the traveling state of the vehicle and damping force is controlled on the basis of the calculated variable damping coefficient $C_v$. In the present embodiment, the variable damping coefficient $C_v$, is calculated on the basis of the nonlinear H-infinity control theory. A method of calculating the variable damping coefficient $C_v$ by use of the nonlinear H-infinity control theory will be described below.

1. Nonlinear H-Infinity Control Theory

First, the nonlinear H-infinity control theory will be described.

1-1. State Space Representation

Figure 5:
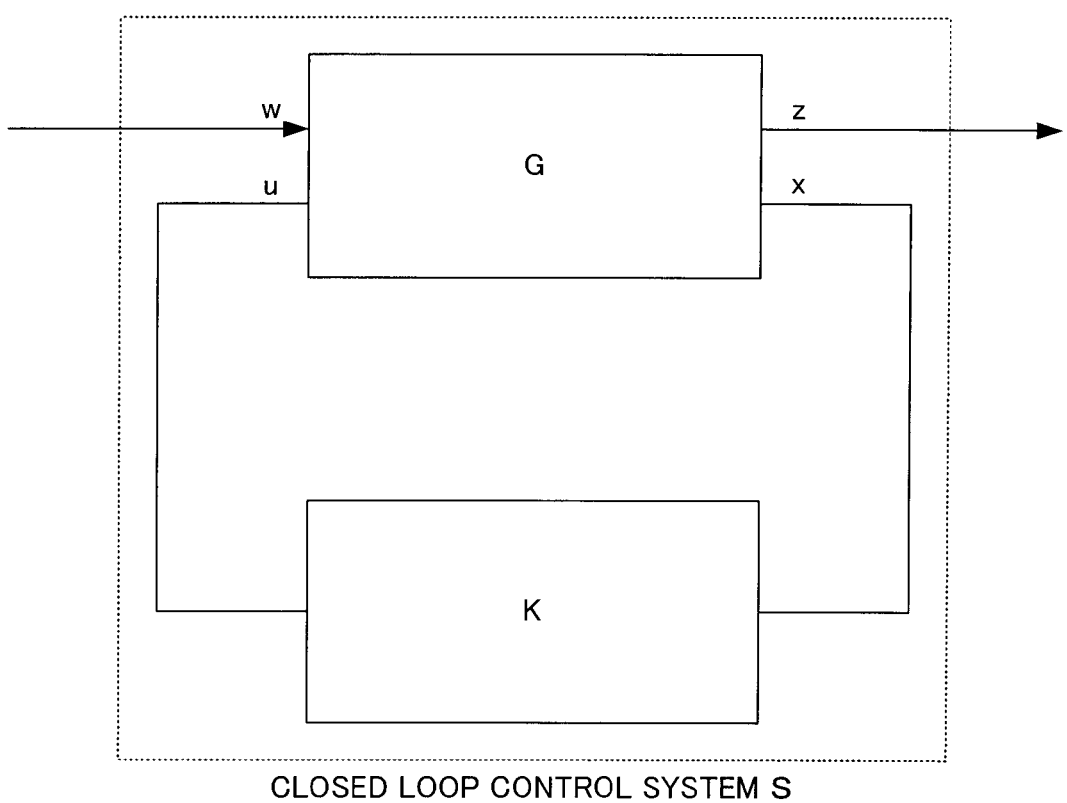
FIG. 5 is a block diagram of a closed loop control system S in which the state quantity of a generalized plant G is fed back.

FIG. 5 is a block diagram of a closed loop control system S in which the state quantity x of a generalized plant G is fed back by a state feedback controller K. In this closed loop control system S, a disturbance is represented by w, an evaluation output is represented by z, a control input is represented by u, and a state quantity is represented by x. The state space representation of the generalized plant G can be represented by the following equation 4 by making use of the disturbance w, the evaluation output z, the control input u, and the state quantity x.

$$\left.\begin{array}{l}\dot{x} = f(x)x + g_1(x)w + g_2(x)u \\ z = h_1(x)x + j_{12}(x)u\end{array}\right\} \quad \text{(eq. 4)}$$

wherein $\dot{x} = dx/dt$

In a special case where the state space representation is represented by the form shown in the following equation 5, a control system represented by the generalized plant G is called a bilinear system.

$$\left.\begin{array}{l}\dot{x} = Ax + B_1 w + B_2(x)u \\ z = C_1 x + D_{12} u\end{array}\right\} \quad \text{(eq. 5)}$$

1-2. Nonlinear H-Infinity State Feedback Control Problem

A nonlinear H-infinity state feedback control problem; that is, a control target in the nonlinear H-infinity state feedback control, is designing the state feedback controller K such that an influence of the disturbance w of the closed loop control system S is prevented from appearing in the evaluation output z to a possible extent. This problem is equal to designing the state feedback controller K ($=u=K(x)$) such that the $L_2$ gain ($\|S\|_{L2}$) of the closed loop control system S becomes less than a certain given positive constant γ; that is, the following equation 6 is satisfied.

$$\|S\|_{L2} = \sup_{w} \frac{\sqrt{\int_0^\infty |z(t)|^2 dt}}{\sqrt{\int_0^\infty |w(t)|^2 dt}} < \gamma \quad \text{(eq. 6)}$$

1-3. Solution of the Nonlinear H-Infinity State Feedback Control Problem

A necessary and sufficient condition for the nonlinear H-infinity state feedback control problem to be solvable is that a positive definite function $V(x)$ and a positive constant $\epsilon$ which satisfy the Hamilton-Jacobi partial differential inequality shown in the following equation 7 are present.

$$\frac{\partial V}{\partial x^T} f + \frac{1}{4\gamma^2} \frac{\partial V}{\partial x^T} g_1 g_1^T \frac{\partial V}{\partial x} - \frac{1}{4} \frac{\partial V}{\partial x^T} g_2 g_2^T \frac{\partial V}{\partial x} + h_1^T h_1 + \epsilon x^T x \leq 0 \quad \text{(eq. 7)}$$

In this case, one state feedback controller K ($=u=K(x)$) is given by the following equation 8.

$$u = -\frac{1}{2} g_x^T(x) \frac{\partial V}{\partial x}(x) \quad \text{(eq. 8)}$$

It is said that solving the Hamilton-Jacobi partial differential inequality is almost impossible. Accordingly, the control input u cannot be derived analytically. However, in the case where the control model is a bilinear system, it is known that presence of a positive definite symmetric matrix P which satisfies the Riccati inequality shown in the following equation 9 is the necessary and sufficient condition for the nonlinear H-infinity state feedback control problem to be solvable. This Riccati inequality can be solved analytically.

$$PA + A^T P + \frac{1}{\gamma^2} PB_1 B_1^T P + C_{11}^T C_{11} + C_{12}^T C_{12} < 0 \quad \text{(eq. 9)}$$

In this case, one state feedback controller K ($=u=K(x)$) is given by the following equation 10.

$$u = -D_{122}^{-1}\{(1+m(x)x^T C_{11}^T V_{11} x) D_{122}^{-T} B_2^T(x) P + C_{12}\} x \quad \text{(eq.10)}$$

In the above-described equations 9 and 10, $C_{11}$ is a matrix by which an control input in an output equation is multiplied, the output equation being in a state space representation of a frequency weight by which the evaluation output is multiplied, and $C_{12}$ is a matrix by which state quantities in an output equation are multiplied, the output equation being in a state space representation of a frequency weight by which the control input is multiplied. $D_{122}$ is a matrix by which state quantities in an output equation are multiplied, the output equation being in a state space representation of a frequency weight by which the evaluation output is multiplied. Further, $m(x)$ is an arbitrary positive definite scalar value function which affects the constraint of a nonlinear weight by which the frequency weight is multiplied. In the case where the nonlinear weight does not act as a weight, $m(x)$ can be set to 0. Accordingly, in the case where the control model represented by the generalized plant G is a bilinear system, the state feedback controller K can be designed by solving the Riccati inequality. Thus, the control input u can be obtained from the designed state feedback controller K.

2. Designing of a Motion Model of the Suspension Apparatus

2-1. Derivation of an Equation of Motion of the Suspension Apparatus

Figure 6:
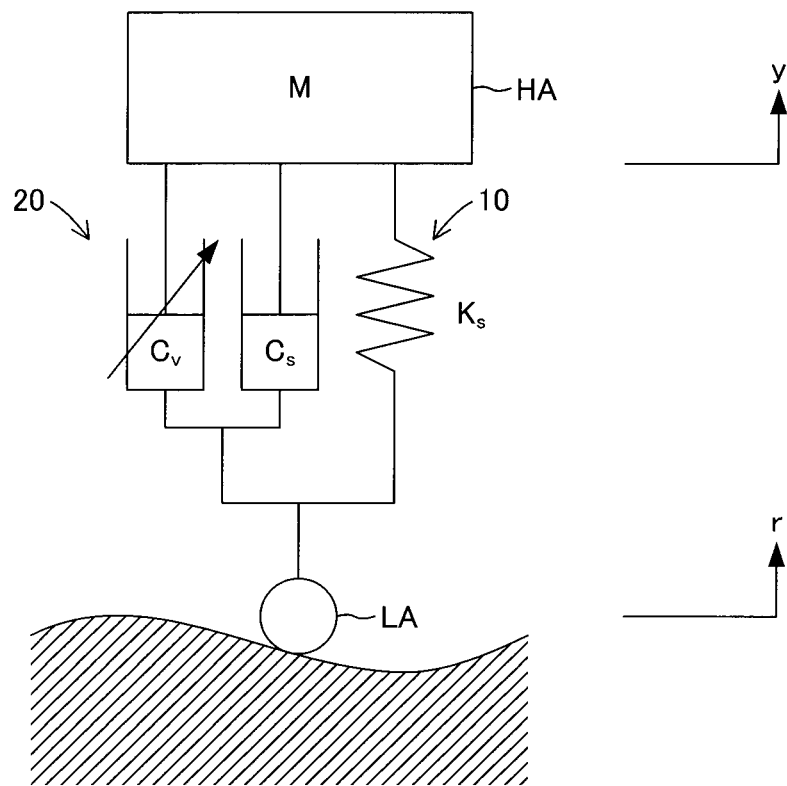
FIG. 6 is an illustration showing a single-wheel model of a suspension apparatus according to the present embodiment.

FIG. 6 shows a single-wheel model of the suspension apparatus 1. In the drawing, M represents the mass of the sprung member HA; $K_s$ represents the spring constant (elastic constant) of the suspension spring 10; $C_s$ represents the linear damping coefficient of the damper 20; $C_v$ represents the variable damping coefficient of the damper 20; y represents the vertical displacement of the sprung member HA (sprung member displacement); r represents the vertical displacement of the unsprung member LA (unsprung member displacement). Notably, in this single-wheel model, the vertical displacement of the unsprung member LA is assumed to be equal to the vertical displacement of a road surface. Accordingly, the unsprung member displacement r also represents the road surface displacement.

The equation of motion of the suspension apparatus 1 represented by the single-wheel model of FIG. 6 is represented by the following equation 11.

$$M\ddot{y} = C_s(\dot{r}-\dot{y}) + K_s(r-y) + (\dot{r}-\dot{y})C_v \quad \text{(eq.11)}$$

wherein
$\ddot{y}=d^2y/dt^2$, $\dot{y}=dy/dt$, $\dot{r}=dr/dt$

2-2. Designing of a Mechanical Motion Model

Figure 7:
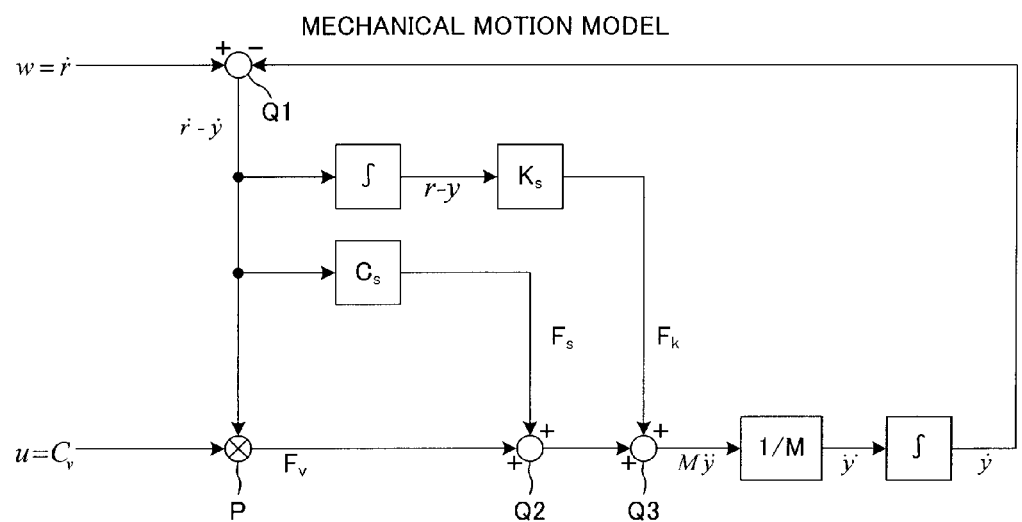
FIG. 7 is a block diagram representing a mechanical motion model of the suspension apparatus.

FIG. 7 is a block diagram representing a mechanical motion model of the suspension apparatus 1. This block diagram represents the motion equation shown in the above-described equation 11. In the drawing, a point represented by symbol P is a multiplying point, and represents the product of two inputs in the time domain.

In this motion model, the control input u is the variable damping coefficient $C_v$; and the disturbance w is the unsprung member speed dr/dt. At an adding point Q1, the sprung member speed dy/dt is subtracted from the unsprung member speed dr/dt, which is the disturbance w. At the multiplying point P, the sprung-unsprung relative speed dr/dt-dy/dt obtained through the subtraction is multiplied by the variable damping coefficient $C_v$, which is the control input u. At adding points Q2 and Q3, the linear damping force $F_s$ ($=C_s(dr/dt-dy/dt)$) and the elastic force $F_k$ ($=K_s(r-y)$) of the suspension spring 10 are respectively added to the variable damping force $F_v$ obtained through the multiplication. Moreover, the result obtained through the addition is multiplied by the reciprocal of the mass M, whereby the sprung member acceleration $d^2y/dt^2$ is represented. This relation is derived from the motion equation shown in the above-described equation 11. Further, the sprung member speed dy/dt is obtained by integrating with time the sprung member acceleration $d^2y/dt^2$ represented as described above. Also, this sprung member speed dy/dt is subtracted from the unsprung member speed dr/dt as described above, whereby the sprung-unsprung relative speed dr/dt-dy/dt is obtained.

In this block diagram, when the sprung-unsprung relative displacement r−y and the sprung member speed dy/dt are selected as state quantities $x_p$, the state space representation is expressed by the following equation 12.

$$\begin{bmatrix} \dot{r}-\dot{y} \\ \ddot{y} \end{bmatrix} = \begin{bmatrix} 0 & -1 \\ K_s/M & -C_s/M \end{bmatrix} \begin{bmatrix} r-y \\ \dot{y} \end{bmatrix} + \begin{bmatrix} 1 \\ C_s/M \end{bmatrix} \dot{r} + \begin{bmatrix} 0 \\ (\dot{r}-\dot{y})/M \end{bmatrix} C_v \quad \text{(eq. 12)}$$

The above-described equation 12 can be expressed by the following equation 13.

$$\dot{x}_p = A_p x_p + B_{p_1} w + B_{p_2}(x_p)u \quad \text{(eq. 13)}$$

wherein $$x_p = \begin{bmatrix} r-y \\ \dot{y} \end{bmatrix}, w = \dot{r}, u = C_v$$

$$A_p = \begin{bmatrix} 0 & -1 \\ K_s/M & -C_s/M \end{bmatrix},$$

$$B_{p_1} = \begin{bmatrix} 1 \\ C_s/M \end{bmatrix},$$

$$B_{p2}(x_p) = \begin{bmatrix} 0 \\ (\dot{r}-\dot{y})/M \end{bmatrix}$$

The control model represented by the above-described equation 13 is a bilinear system. Accordingly, by solving the Riccati inequality, the control input u; i.e., the variable damping coefficient $C_v$, can be obtained.

3. Designing of a Delay-Considered Model

In the case where the damping force of the suspension apparatus 1 is controlled through operation of the actuator 32, operation delay of the actuator 32 causes deviation of control timing. The motion model of FIG. 7 is not designed in consideration of operation delay of the actuator 32. Therefore, even in the case where the control input u (the variable damping coefficient $C_v$) is calculated on the basis of the above-described equation 12 and the damping force is controlled on the basis of the calculated control input u, control timing deviates or shifts by an amount corresponding to the operation delay of the actuator 32. Therefore, proper damping force control cannot be performed. Accordingly, the control system must be designed in consideration of deviation of control timing caused by the operation delay.

Figure 8:
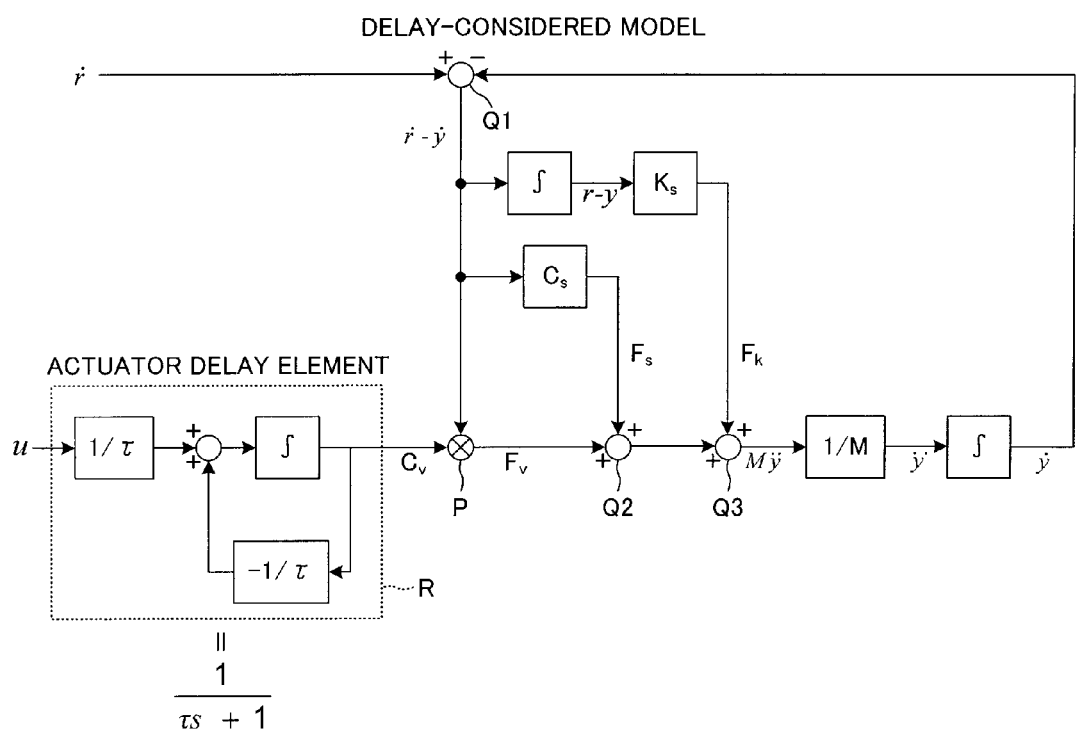
FIG. 8 is a block diagram representing a delay-considered model, which is a control model designed on the basis of the mechanical motion model of the suspension apparatus and in consideration of first-order delay of an actuator.

FIG. 8 is a block diagram representing a delay-considered model, which is a control model designed on the basis of the mechanical motion model of the suspension apparatus 1 and in consideration of first-order delay of the actuator 32. In the drawing, a block ($1/(\tau s+1)$) denoted by symbol R is a delay element representing the first-order delay of the actuator 32. The delay-considered model is designed such that the delay element R acts on the control input u. If a state feedback controller of a closed loop control system which uses this delay-considered model can be designed, the control input u output from the state feedback controller is one determined in consideration of the delay of the actuator 32. Accordingly, deviation of control timing caused by the delay can be eliminated by means of controlling the damping force of the suspension apparatus 1 by operating the actuator 32 on the basis of the control input u determined in consideration of the delay.

In this case, the relation between the variable damping coefficient $C_v$ and the control input u can be represented by the following equation 14, in which the first-order delay is considered.

$$C_v = \frac{1}{\tau s + 1} u \quad \text{(eq. 14)}$$

In the above-described equation 14, s represents a Laplace operator, and t represents a time constant. When the above-described equation 14 is re-written into a state space representation, the following equation 15 is obtained.

$$\left. \begin{array}{l} \dot{x}_\tau = -\frac{1}{\tau} x_\tau + \frac{1}{\tau} u \\ C_v = x_\tau \end{array} \right\} \quad \text{(eq. 15)}$$

When the sprung-unsprung relative displacement r−y, the sprung member speed dy/dt, and $x_t$ (=the variable damping coefficient $C_v$) are selected as state quantities, the state space representation of the delay-considered model shown in FIG. 8 is expressed by the following equation 16, which is obtained by incorporating the equation 15 into the equation 12.

$$\begin{bmatrix} \dot{r}-\dot{y} \\ \ddot{y} \\ \dot{x}_\tau \end{bmatrix} = \begin{bmatrix} 0 & -1 & 0 \\ K_s/M & -C_s/M & \underline{(\dot{r}-\dot{y})/M} \\ 0 & 0 & -1/\tau \end{bmatrix} \begin{bmatrix} r-y \\ \dot{y} \\ x_\tau \end{bmatrix} + \quad \text{(eq. 16)}$$

$$\begin{bmatrix} 1 \\ C_s/M \\ 0 \end{bmatrix} \dot{r} + \begin{bmatrix} 0 \\ 0 \\ 1/\tau \end{bmatrix} u$$

The matrix by which state quantities of the first term of the right side of the above-described equation 16 is multiplied includes a component regarding the state quantities as indicated by an underline. Therefore, this equation 16 is a nonlinear system including the product of the state quantities. That is, the equation 16 can be expressed by the following equation 17.

$$\dot{x}_p = A_p(x_p)x_p + B_{P1}w + B_{P2}u \quad \text{(eq.17)}$$

The delay-considered model whose state space representation is expressed by the above-described equation 17 is not a bilinear system. Accordingly, the Riccati inequality cannot be applied. Therefore, the feedback controller of the closed loop control system cannot be designed, and the control input u cannot be obtained.

4. Designing of a Delay-Approximated Model M (Present Invention)

Figure 9:
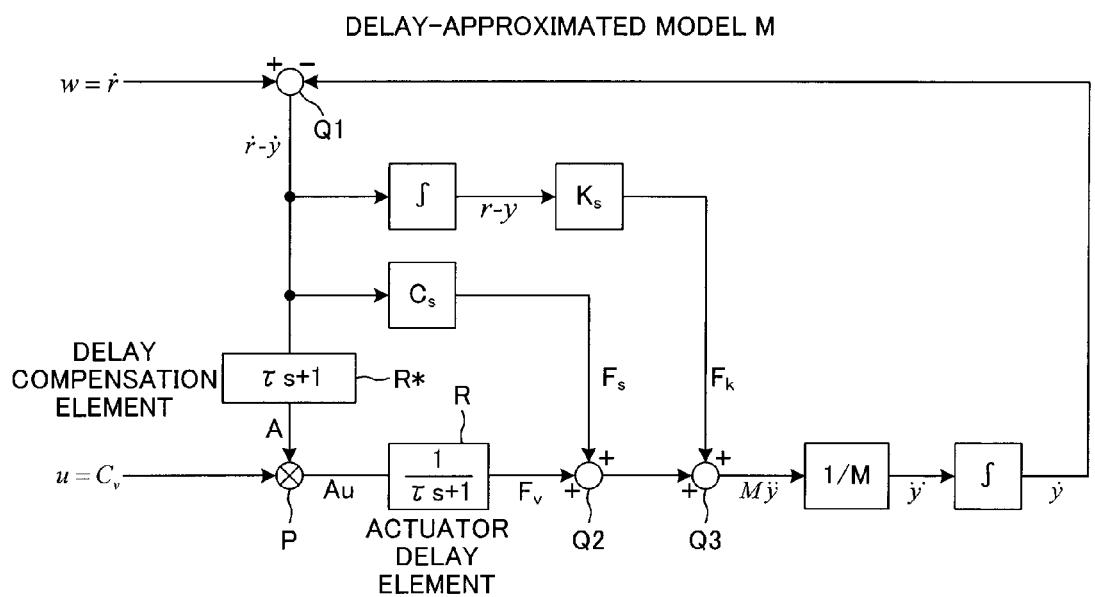
FIG. 9 is a block diagram of a delay-approximated model, which is a control model of the present embodiment.

In the present embodiment, a delay-approximated model M, which is a control model represented by a block diagram of FIG. 9, is proposed. The delay-approximated model M is a control model designed such that a delay element R and a delay compensation element R* act on the mechanical motion model of the suspension apparatus 1. The delay compensation element R* is set in advance as an element for cancelling out the first-order delay of the actuator 32 represented by the delay element R. For example, in the case where the delay element R is a first-order delay element represented by the following equation 18, the delay compensation element R* is represented by the following equation 19.

$$R = \frac{1}{\tau s + 1} \quad \text{(eq. 18)}$$

$$R^* = \tau s + 1 \quad \text{(eq. 19)}$$

wherein τ represents a time constant, and s represent Laplace operator. That is, the delay element R and the delay compensation element R* have a relation such that, when the two elements are multiplied together, the result of the multiplication becomes 1.

Also, as can be understood from FIG. 9, the delay compensation element R* acts on the sprung-unsprung relative speed dr/dt-dy/dt, which is the speed of externally input vibration. The output A of the delay compensation element R* and the control input u are multiplied together. The delay element R acts on the product Au thereof. The output of the delay element R is used as the variable damping force $F_v$, which is a variable portion of the damping force. The delay-approximated model M is designed to satisfy the above-described relation.

The delay-approximated model M shown in FIG. 9 is a bilinear system. This is proved as follows.

First, the state space representation of the motion equation of the single-wheel model represented by the above-described equation 12 is rewritten into the flowing equation 20.

$$\begin{bmatrix} \ddot{r} - \ddot{y} \\ \ddot{y} \end{bmatrix} = \begin{bmatrix} 0 & -1 \\ K_s/M & -C_s/M \end{bmatrix} \begin{bmatrix} r - y \\ \dot{y} \end{bmatrix} + \begin{bmatrix} 1 \\ C_s/M \end{bmatrix} \dot{r} + \begin{bmatrix} 0 \\ 1/M \end{bmatrix} F_v \quad \text{(eq. 20)}$$

Also, the output A shown in FIG. 9 is represented by the following equation 21.

$$A = (\tau s + 1)(\dot{r} - \dot{y}) = \tau(e\ddot{r} - \ddot{y}) + (\dot{r} - \dot{y}) \quad \text{(eq. 21)}$$

The variable damping force $F_v$ is represented by the following equation 22.

$$F_v = \frac{1}{\tau s + 1} A u \quad \text{(eq. 22)}$$

The state space representation of the equation 22 is expressed by the following equation 23.

$$\left. \begin{array}{l} \dot{x}_\tau = -\frac{1}{\tau} x_\tau + \frac{1}{\tau} \{\tau(\dot{r} - \dot{y}) + (r - y)\} u \\ F_v = x_\tau \end{array} \right\} \quad \text{(eq. 23)}$$

By incorporating the relation of the equation 23 into the state space representation of the equation 20, the following equation 24 is obtained as a state space representation of the delay-approximated model M.

$$\begin{bmatrix} \dot{r} - \dot{y} \\ \ddot{y} \\ \dot{x}_\tau \end{bmatrix} = \begin{bmatrix} 0 & -1 & 0 \\ K_s/M & -C_s/M & 1/M \\ 0 & 0 & -1/\tau \end{bmatrix} \begin{bmatrix} r - y \\ \dot{y} \\ x_\tau \end{bmatrix} + \begin{bmatrix} 1 \\ C_s/M \\ 0 \end{bmatrix} \dot{r} + \begin{bmatrix} 0 \\ 0 \\ \{\tau(\dot{r} - \dot{y}) + (r - y)\}/\tau \end{bmatrix} u \quad \text{(eq. 24)}$$

wherein
$\dot{r} - \dot{y}$ represents the sprung-unsprung relative speed; $\ddot{y}$ represents the sprung member acceleration; $\dot{x}_\tau$ represents the differentiated value of the variable damping force; r−y represents the sprung-unsprung relative displacement; $\dot{y}$ represents the sprung member speed; $x_\tau$ represents the variable damping force; $\ddot{r} - \ddot{y}$ represents the sprung-unsprung relative acceleration; $\dot{r}$ represents the unsprung member speed; u represents the control input; $K_s$ represents the elastic coefficient (spring constant) of an elastic member (e.g., a spring); M represents the mass of the sprung member; $C_s$ represents the linear damping coefficient; and t represents the time constant.

The equation 24 can be represented as shown in the following equation 25.

$$\dot{x}_p = A_p x_p + B_{p_1} w + B_{p_2}(x) u \quad \text{(eq. 25)}$$

wherein:

$$x_p = \begin{bmatrix} r - y \\ \dot{y} \\ x_\tau \end{bmatrix}, w = \dot{r}, u = C_v$$

$$A_p = \begin{bmatrix} 0 & -1 & 0 \\ K_s/M & -C_s/M & 1/M \\ 0 & 0 & -1/\tau \end{bmatrix},$$

$$B_{p1} = \begin{bmatrix} 1 \\ C_s/M \\ 0 \end{bmatrix},$$

$$B_{p2}(x) = \begin{bmatrix} 0 \\ 0 \\ \{\tau(\dot{r} - \dot{y}) + (r - y)\}/\tau \end{bmatrix}$$

As can be understood from the equation 25, the delay-approximated model M is a bilinear system.

5. Comparison between the Delay-Approximated Model M and the Delay-Considered Model The delay-approximated model M of FIG. 9 and the delay-considered model of FIG. 8 will be compared under the flowing conditions A and B.

Condition A: the case where the sprung-unsprung relative speed dr/dt-dy/dt is constant (=α)

Condition B: the case where the control input u is constant (=β)

A. Case where the sprung-unsprung relative speed dr/dt-dy/dt is constant (=α)

In this case, when dr/dt-dy/dt is represented by v, v=α. Accordingly, in the delay-considered mode shown in FIG. 8, the variable damping force $F_v$ is represented by the following equation 26.

$$F_v = C_v v = \alpha C_v = \frac{\alpha}{\tau s + 1} u \quad \text{(eq. 26)}$$

As can be understood from the equation 26, the variable damping force $F_v$ is influenced by the first-order delay ($1/(\tau s+1)$). Accordingly, in the case where the sprung-unsprung relative speed dr/dt-dy/dt is constant ($=\alpha$), the response of the variable damping force $F_v$ lags behind the control input u.

In contrast, in the delay-approximated model M of the present embodiment shown in FIG. 9, when the Laplace transformation L(v) of the relative speed v is represented by a step response ($=\alpha/s$), the following equation 27 stands up for the Laplace transformation L(A) of the output A.

$$L(A) = (\tau s + 1)L(v) = (\tau s + 1)\frac{\alpha}{s} \qquad \text{(eq. 27)}$$

Since the relative speed v is steadily constant ($=\alpha$), the following equation 28 stands up because of the final-value theorem.

$$\lim_{t\to\infty} A(t) = \lim_{s\to 0} sL(A) = \lim_{s\to 0} \alpha(\tau s + 1) = \alpha \qquad \text{(eq. 28)}$$

Therefore, $A=\alpha$ holds if the sprung-unsprung relative speed dr/dt-dy/dt is constant ($=\alpha$).

Since $A=\alpha$, in the delay-approximated model M shown in FIG. 9, the variable damping force is represented by the following equation 29.

$$F_v = \frac{1}{\tau s + 1}Au = \frac{\alpha}{\tau s + 1}u \qquad \text{(eq. 29)}$$

As can understood from the equation 29, the variable damping force is influenced by the first-order delay ($1/(\tau s+1)$). Accordingly, in the case where the sprung-unsprung relative speed dr/dt-dy/dt is constant, the response of the variable damping force $F_v$ lags behind the control input u.

B. Case where the Control Input u is Constant ($=\beta$)

Here, there will be considered the case where the control input u is constant ($=\beta$); that is, $u=\beta$. In the delay-considered model of FIG. 8, when the Laplace transformation L(u) of u is represented by a step response ($=\beta/s$), the following equation 30 holds for the Laplace transformation $L(C_v)$ of the variable damping coefficient $C_v$.

$$L(C_v) = \frac{1}{\tau s + 1}L(u) = \frac{1}{\tau s + 1}\frac{\beta}{s} \qquad \text{(eq. 30)}$$

Since u is steadily constant, the following equation 31 stands up because of the final-value theorem.

$$\lim_{t\to\infty} C_v = \lim_{s\to 0} sL(C_v) = \lim_{s\to 0} \frac{\beta}{\tau s + 1} = \beta \qquad \text{(eq. 31)}$$

From the above-described equation 31, a relation $C_v=\beta$ is obtained. Therefore, in the delay-considered model of FIG. 8, the variable damping force Fv is represented by the following equation 32.

$$F_v = C_v v = \beta v \qquad \text{(eq.32)}$$

As can be understood from the equation 32, the variable damping force $F_v$ is not influenced by the first-order delay. That is, in the case where the control input u is constant ($=\beta$), the response of the variable damping force $F_v$ does not lag behind the sprung-unsprung relative speed v.

Furthermore, in the delay-approximated model M of FIG. 9, the variable damping force $F_v$ is represented by the following equation 33.

$$F_v = \frac{1}{\tau s + 1}Au = \frac{\beta}{\tau s + 1}A \qquad \text{(eq. 33)}$$

Also, the output A is represented by the following equation 34.

$$A=(\tau s+1)(\dot{r}-\dot{y})=(\tau s+1)v \qquad \text{(eq.34)}$$

From the equations 33 and 34, the variable damping force $F_v$ in the delay-approximated model M of FIG. 9 is represented by the following equation 35.

$$F_v = \frac{\beta}{\tau s + 1}(\tau s + 1)v = \beta v \qquad \text{(eq. 35)}$$

As can be understood from the equation 35, the variable damping force $F_v$ is not influenced by the first-order delay. That is, in the case where the control input u is constant ($=\beta$), the response of the variable damping force $F_v$ does not lag behind the sprung-unsprung relative speed v.

The variable damping force F, in the delay-approximated model M of FIG. 9 and the variable damping force $F_v$ in the delay-considered model of FIG. 8 were compared for the case where the sprung-unsprung relative speed v is constant ($=\alpha$) and the case where the control input u is constant ($=\beta$). The following table shows the results of the comparison.

|  | Delay-approximated model M (FIG. 9) | Delay-considered model (FIG. 8) |
| --- | --- | --- |
| $v = \alpha$ | $F_v = \dfrac{\alpha}{\tau s + 1}u$ | $F_v = \dfrac{\alpha}{\tau s + 1}u$ |
| $u = \beta$ | $F_v = \beta v$ | $F_v = \beta v$ |

As can be understood from the table, in the case where the sprung-unsprung relative speed dr/dt-dy/dt is constant and the case where the control input u is constant, the variable damping force $F_v$ in the delay-approximated model and the variable damping force $F_v$ in the delay-considered model become equal to each other. That is, under these conditions, the delay-approximated model is a control model equivalent to the delay-considered model.

This means that, when a change $\Delta v$ in the sprung-unsprung relative speed dr/dt-dy/dt with time (hereinafter referred to as the time course change $\Delta v$ of the sprung-unsprung relative speed dr/dt-dy/dt) is very small, and when a change $\Delta u$ in the control input u with time (hereinafter referred to as the time course change $\Delta u$ of the control input u) is very small, the variable damping force $F_v$ in the delay-approximated model and the variable damping force $F_v$ in the delay-considered model assume values very close to each other. Accordingly, when the time course change $\Delta v$ of the sprung-unsprung relative speed dr/dt-dy/dt is very small, and when the time course change $\Delta u$ of the control input u is very small, the delay-approximated model M becomes a control model which can be considered to be equivalent to the delay-considered model. That is, in the case where both the time course change Δv of the sprung-unsprung relative speed dr/dt−dy/dt and the time course change Δu of the control input u are within respective very small ranges, the delay-approximated model M approximates the delay-considered model.

In this case, since the ranges of Δv and Δu change depending on a control model to be handled, the magnitude of the delay, etc., the ranges cannot be determined unconditionally. For example, when the upper limit of the absolute value of Δv is 0.05 to 0.5 m/s, the delay-approximated model M approximates the delay-considered model in some cases. When the upper limit of the absolute value of Δu is 100 to 400 N·S/m, the delay-approximated model M approximates the delay-considered model in some cases. For example, Δv and/or Δu are within respective ranges represented by the following equations 36 and 37, respectively.

$$|\Delta v| \leq 0.1 \text{ [m/s]} \quad \text{(eq. 36)}$$

$$|\Delta u| \leq 200 \text{ [N·s/m]} \quad \text{(eq. 37)}$$

As is clear from the above-described consideration, in the case where a motion model designed such that the change amount of the sprung-unsprung relative speed and the change amount of the control input fall within the ranges in which the delay-approximated model M approximates the delay-considered model is handled, the delay-considered model can be replaced with the delay-approximated model M. Since the delay-approximated model M is a bilinear system, the state feedback controller K of the closed loop control system can be designed by solving the Riccati inequality. Furthermore, since the delay-approximated model M is a control model designed in consideration of operation delay of the actuator 32, the control input u calculated by the designed state feedback controller K also becomes one calculated in consideration of the first-order delay of the actuator 32. Therefore, by means of operating the actuator 32 on the basis of the obtained control input u, damping force control which is corrected for deviation of control timing due to delay can be performed.

6. Designing of a Generalized Plant G

In the delay-approximated model M of FIG. 9, the sprung-unsprung relative displacement r−y, the sprung member speed dy/dt, and the control input u are selected as evaluation outputs $z_p$. Furthermore, as shown in the above-described equation 25, the state quantities $x_p$ are the sprung-unsprung relative displacement r−y, the sprung member speed dy/dt, and xτ. In such a case, the state space representation of the delay-approximated model M is represented by the following equation 38.

$$\begin{aligned}\dot{x}_p &= A_p x_p + B_{p1} w + B_{p2}(x_p)u \\ z_p &= C_{p1} x_p + D_{p12} u\end{aligned} \quad \text{(eq. 38)}$$

wherein $$x_p = \begin{bmatrix} r-y \\ \dot{y} \\ x_\tau \end{bmatrix}, z_p = \begin{bmatrix} r-y \\ \dot{y} \\ u \end{bmatrix}, w = \dot{r}, u = C_v$$

$$A_p = \begin{bmatrix} 0 & -1 & 0 \\ K_s/M & -C_s/M & 1/M \\ 0 & 0 & -1/\tau \end{bmatrix}, B_{p1} = \begin{bmatrix} 1 \\ C_s/M \\ 0 \end{bmatrix},$$

$$B_{p2}(x) = \begin{bmatrix} 0 \\ 0 \\ \{\tau(\dot{r}-\dot{y})+(r-y)\}/\tau \end{bmatrix}, C_{p1} = \begin{bmatrix} 1 & 0 & 0 \\ 0 & 1 & 0 \\ 0 & 0 & 0 \end{bmatrix},$$

$$D_{p12} = \begin{bmatrix} 0 \\ 0 \\ 1 \end{bmatrix}$$

Figure 10:
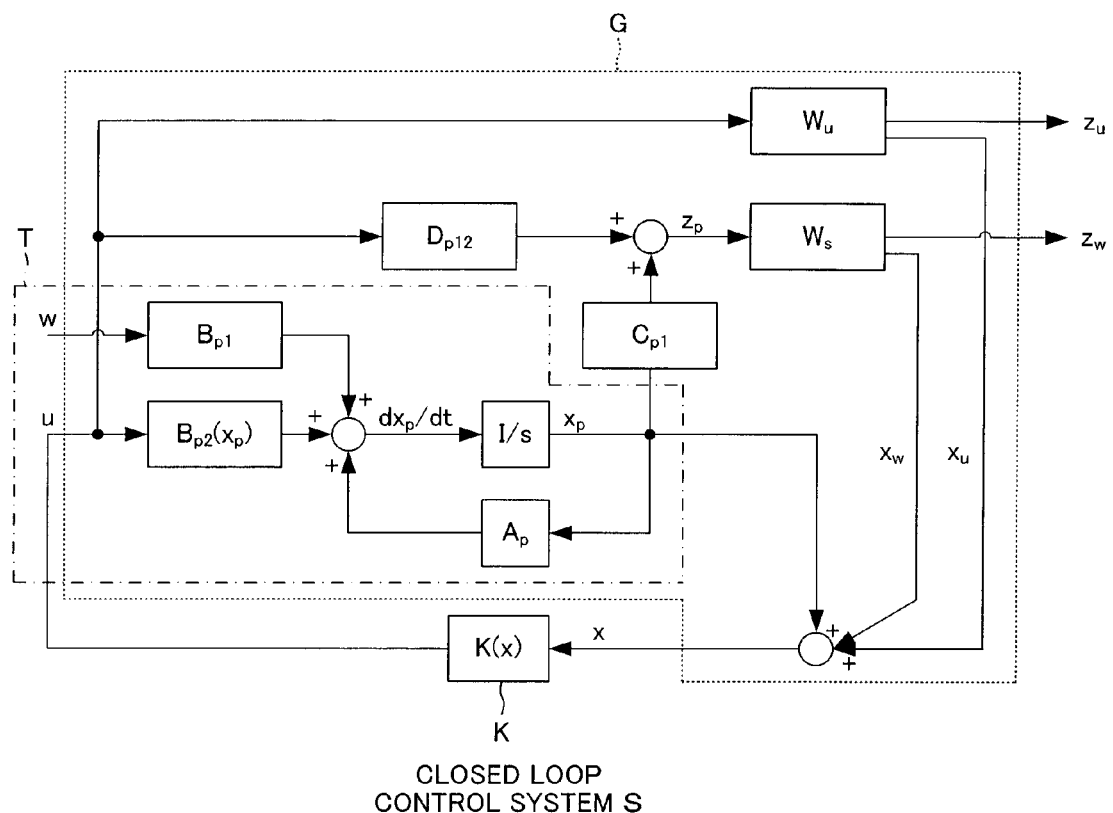
FIG. 10 is a block diagram of a closed loop control system S, which is composed of a generalized plant G which uses the delay-approximated model of the present embodiment, and a state feedback controller K for the generalized plant G.
Figure 11:
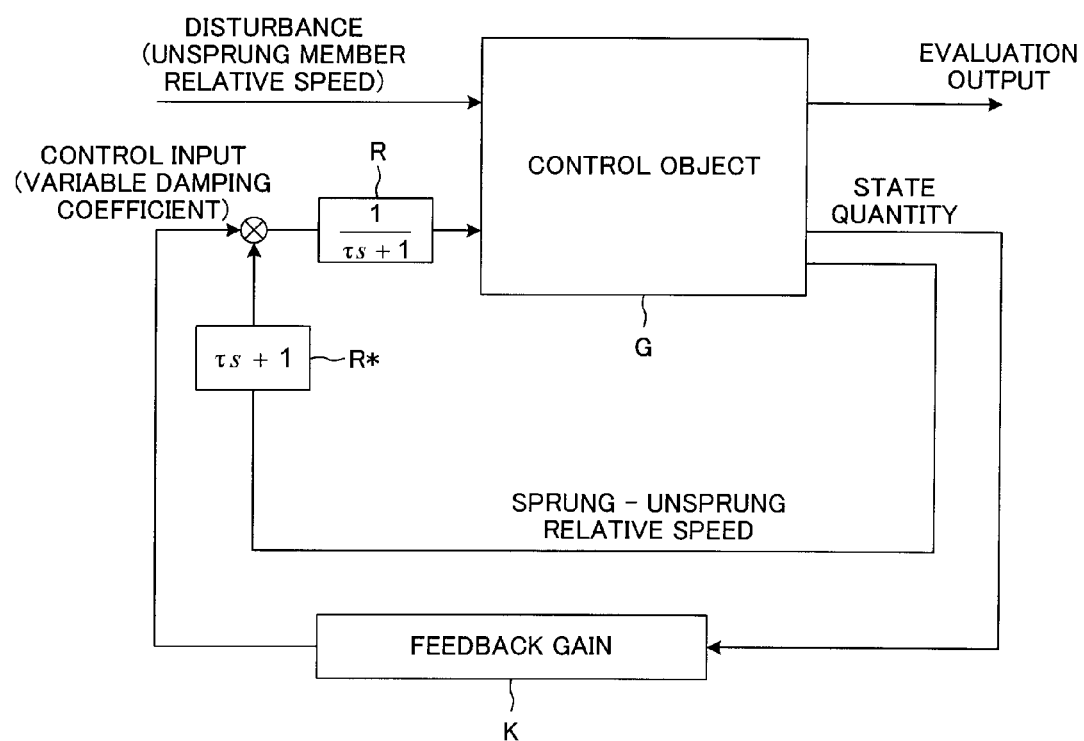
FIG. 11 is a block diagram of the closed loop control system S which specifically shows acting locations of a delay element and a delay compensation element.

FIG. 10 is a block diagram representing a closed loop control system S composed of a generalized plant G designed by making use of the delay-approximated model M of FIG. 9 represented by the equation 38, and a state feedback controller K (K(x)) for the generalized plant G. FIG. 11 is a block diagram of the closed loop control system S in which the acting locations of the delay element R and the delay compensation element R* are clearly shown. A region T in FIG. 10 surrounded by a chain line corresponds to the delay-approximated model M shown in FIG. 9. As can be understood from FIG. 10, a frequency weight $W_s$, which is a weight changing with frequency, is applied to the evaluation output $z_p$. The state space representation of the frequency weight $W_s$ is expressed by use of the state quantity $x_w$, the output $z_w$ and respective constant matrixes $A_W$, $B_W$, $C_W$, $D_W$, as shown in the following equation 39.

$$\begin{aligned}\dot{x}_w &= A_w x_w + B_w z_p \\ z_w &= C_w x_w + D_w z_p\end{aligned} \quad \text{(eq. 39)}$$

wherein $$\dot{x}_w = dx_w/dt$$

The equations 39 can be transformed into the following equation 40.

$$\begin{aligned}\dot{x}_w &= A_w x_w + B_w C_{p1} x_p + B_w D_{p12} u \\ z_w &= C_w x_w + D_w C_{p1} x_p + D_w D_{p12} u\end{aligned} \quad \text{(eq. 40)}$$

Furthermore, a frequency weight $W_u$, which is a weight changing with frequency, is applied to the control input u. The state space representation of the frequency weight $W_u$ is expressed by use of the state quantity $x_u$, the output $z_u$ and respective constant matrixes $A_u$, $B_u$, $C_u$, $D_u$, as shown in the following equation 41.

$$\begin{aligned}\dot{x}_u &= A_u x_u + B_u u \\ z_u &= C_u x_u + D_u u\end{aligned} \quad \text{(eq. 41)}$$

wherein $$\dot{x}_u = dx_u/dt$$

By using the above-described equations 38 to 41, the state space representation of the generalized plant G is expressed by the following equation 42.

$$\begin{aligned}\dot{x} &= Ax + B_1 w + B_2(x)u \\ z_w &= C_{11} x + D_{121} u \\ z_u &= C_{12} x + D_{122} u\end{aligned} \quad \text{(eq. 42)}$$

-continued wherein $$x = \begin{bmatrix} x_p \\ x_w \\ x_u \end{bmatrix}, A = \begin{bmatrix} A_p & o & o \\ B_w C_{p1} & A_w & o \\ o & o & A_u \end{bmatrix},$$

$$B_1 = \begin{bmatrix} B_{p1} \\ o \\ o \end{bmatrix}, B_2(x) = \begin{bmatrix} B_{p2}(x_p) \\ B_w D_{p12} \\ B_u \end{bmatrix}$$

$$C_{11} = [D_w C_{p1} \ C_w \ o], D_{121} = [D_w D_{p12}],$$

$$C_{12} = [o \ o \ C_u], D_{122} = D_u$$

7. Calculation of the Control Input u

In the case where the state space representation of the generalized plant G is expressed by the above-described equation 42, the generalized plant G becomes a bilinear system. Accordingly, in the case where a positive definite symmetric matrix which satisfies the Riccati inequality shown in the following equation 43 for the previously set positive constant γ exists, the closed loop control system S of FIG. 10 has a satisfactory internal stability, and the $L_2$ gain of the system, which represents the robustness against disturbances, can be made less than γ.

$$PA + A^T P + \frac{1}{\gamma^2} PB_1 B_1^T P + C_{11}^T C_{11} + C_{12}^T C_{12} < 0 \quad \text{(eq. 43)}$$

In this case, one state feedback controller K (=K(x)), which represents the control input u, is represented by the following equation 44.

$$K(x) = u = -D_{122}^{-1}(D_{122}^{-T} B_2^T(x) P + C_{12})x \quad \text{(eq. 44)}$$

The equation 44 is expressed by the following equation 46 under the condition represented by the following equation 45.

$$C_{12} = o, D_{122} = I \quad \text{(eq. 45)}$$

$$K(x) = u = -B_2^T(x) Px \quad \text{(eq. 46)}$$

The control input u is calculated by the state feedback controller K designed in accordance with the above-described equation 46; that is, the state feedback controller K designed such that the $L_2$ gain of the closed loop control system S becomes less than the positive constant γ. The calculated control input u represents the variable damping coefficient $C_v$.

The variable damping coefficient $C_v$ represented by the control input u calculated by the state feedback controller K for the generalized plant G, which is designed by use of the delay-approximated model M, is a damping coefficient determined in consideration of the first-order delay of the actuator 32; that is, a damping coefficient corrected such that deviation of control timing caused by first-order delay of the actuator 32 is eliminated. The microcomputer 60 calculates the requested damping force $F_{req}$ and the requested step number $D_{req}$ by use of the variable damping coefficient $C_v$ calculated in the above-described manner, and controls the variable throttle mechanism 30 such that the step number representing the damping force characteristic of the damper 20 coincides with the calculated requested step number $D_{req}$. With this operation, the deviation of control timing caused by operation delay of the actuator 32 is eliminated, and the damping force of the suspension apparatus 1 is controlled such that vibration of the sprung member HA is restrained. That is, according to the damping force controller of the present embodiment, it becomes possible to perform damping force control which is free from adverse effects such as deviation of control timing caused by operation delay of the actuator 32.

As having been described above, the delay-approximated model M of FIG. 9, which is the control model of the present embodiment, is designed such that the delay element R representing the first-order delay of the actuator 32, and the delay compensation element R* for cancelling out the delay act on the mechanical motion model of the suspension apparatus 1. Furthermore, the delay-approximated model M is designed such that the delay compensation element R* acts on the sprung-unsprung relative speed dr/dt-dy/dt, which is the speed of externally input vibration, its output A is multiplied by the control input u (the variable damping coefficient $C_v$), and the delay element R acts on the product Au.

Since the delay-approximated model M designed in this manner is a bilinear system, by solving the Riccati inequality, the state feedback controller K can be designed such that the $L_2$ gain of the closed loop control system S of FIG. 10, which includes the generalized plant G designed by use of the delay-approximated model M, and the state feedback controller K for the generalized plant G, becomes less than the previously set positive constant γ. Furthermore, the delay-approximated model M approximates the delay-considered model of FIG. 8. Therefore, the variable damping coefficient $C_v$, which is the control input u calculated by the designed state feedback controller K, becomes a damping coefficient determined in consideration of the first-order delay of the actuator 32 such that deviation of control timing caused by the delay is eliminated. Since the damping force characteristic of the damper 20 is controlled in accordance with the requested step number $D_{req}$ determined on the basis of the variable damping coefficient $C_v$, there is performed optimal damping force control which is free from adverse effects such as deviation of control timing caused by first-order delay of the actuator 32.

Furthermore, the microcomputer 60, which serves as the damping force controller, controls the damping force of the suspension apparatus 1 of the vehicle. Accordingly, there is performed optimal riding quality control which is free from adverse effects which are caused by deviation of control timing which is caused by delay of the actuator 32. Moreover, since the state space representation of the delay-approximated model M designed for the suspension apparatus 1 is represented by the above-described equation 24, the control model can be made bilinear.

The following inventions are also conceived from the above-described embodiment.

(1) A delay-approximated model M which is a control model used when damping force generated by a damping force generation apparatus against externally input vibration is controlled by operating an actuator, in which a delay element R representing operation delay of the actuator and a delay compensation element R* cancelling out the delay act on a mechanical motion model of the damping force generation apparatus, the delay-approximated model M being a bilinear system, and being designed to approximate a delay-considered model which is a control model designed on the basis of the mechanical motion model of the damping force generation apparatus and in consideration of the delay.

(2) A damping force controller which controls damping force generated by a damping force generation apparatus against externally input vibration by operating an actuator, comprising:

control input calculation means for calculating a control input u by applying a nonlinear H-infinity control theory to a closed loop control system S including a generalized plant G and a state feedback controller K, the generalized plant G being designed by making use of a delay-approximated model M which is a control model in which a delay element R representing operation delay of the actuator and a delay compensation element R* cancelling out the delay act on a mechanical motion model of the damping force generation apparatus, which is a bilinear system, and which is designed to approximate a control model designed on the basis of the mechanical motion model of the damping force generation apparatus and in consideration of the delay; and operation control means for controlling the operation of the actuator on the basis of the control input u calculated by the control input calculation means.

(3) A vibration controller which controls vibration of a given control object by operating an actuator, comprising:

control input calculation means for calculating a control input u by applying a nonlinear H-infinity control theory to a closed loop control system S including a generalized plant G and a state feedback controller K, the generalized plant G being designed by making use of a delay-approximated model M which is a control model in which a delay element R representing operation delay of the actuator and a delay compensation element R* cancelling out the delay act on a mechanical motion model (vibration model) of the control object, which is a bilinear system, and which is designed to approximate a control model designed on the basis of the mechanical motion model and in consideration of the delay; and operation control means for controlling the operation of the actuator on the basis of the control input u calculated by the control input calculation means.

(4) In the controllers or in the delay-approximated model M described in the paragraphs (1) to (3), the delay-approximated model M is designed such that the delay compensation element R* acts on the speed dr/dt-dy/dt of externally input vibration; its output is multiplied by the control input u; and the delay element R acts on the result of the multiplication.

(5) A method of designing a control system for controlling damping force generated by a damping force generation apparatus against externally input vibration by operating an actuator, the method comprising the steps of:

designing a generalized plant G by making use of a delay-approximated model M which is a control model in which a delay element R representing operation delay of the actuator and a delay compensation element R* cancelling out the delay act on a mechanical motion model of the damping force generation apparatus, which is a bilinear system, and which is designed to approximate a delay-considered model which is a control model designed on the basis of the mechanical motion model of the damping force generation apparatus and in consideration of the delay;

designing a closed loop control system S which includes a state feedback controller K for the generalized plant G; and designing the state feedback controller K such that the $L_2$ gain of the closed loop control system S becomes less than a previously set positive constant γ.

The present invention is not limited to the above-described embodiment. In the above-described embodiment, the damping force controller of the present invention is applied to the suspension apparatus of a vehicle. However, the damping force controller of the present invention can be applied to other damping force generation apparatuses, so long as the apparatuses involve delay of actuators. In the above-described embodiment, damping force control for the case where the actuator causes first-order delay has been described. However, the present invention can be applied to the case where delay, other than those considered as the first-order delay, occurs. For example, in the case where the delay element R represents second-order delay, the delay compensation element R* is set to cancel out the second-order delay. Furthermore, in the case where the timing at which operation of the actuator starts delays because of a processing-related reason, the delay compensation element R* is set to cancel out that delay.

In the above-described embodiment, description is provided for the numerical ranges of the time course change Δv of the sprung-unsprung relative speed dr/dt-dy/dt and the time course change Δu of the control input u, in which ranges the delay-approximated model M approximates the delay-considered model. However, as described above, the ranges of these time course changes change depending on the magnitude of the delay of the actuator and a model to be handled. Therefore, the ranges cannot be determined unconditionally. Also, the present invention is not limited to these numerical values.

Moreover, in the case where the sprung-unsprung relative speed dr/dt-dy/dt of a control object and/or the control input u changes only within a range in which the delay-approximated model M approximates the delay-considered model, the delay-approximated model M of the present invention can be always applied to the control object as a control mode. For control objects for which the delay-approximated model M cannot be always used, the delay-approximated model M can be applied as a control model in a range in which the delay-approximated model M approximates the delay-considered model.

As described above, the present invention can be modified without departing from the scope of the invention.

The invention claimed is:

1. A damping force controller which controls damping force generated by a damping force generation apparatus against externally input vibration by operating an actuator, comprising:

control input calculation means for calculating a control input u by use of a state feedback controller K designed such that an $L_2$ gain of a closed loop control system S including a generalized plant G and the state feedback controller K for the generalized plant G becomes less than a previously set positive constant γ, the generalized plant G being designed by making use of a delay-approximated model M which is a control model in which a delay element R representing operation delay of the actuator and a delay compensation element R* cancelling out the delay act on a mechanical motion model of the damping force generation apparatus, which is a bilinear system, and which is designed to approximate a control model designed on the basis of the mechanical motion model of the damping force generation apparatus and in consideration of the delay, when a change amount of the speed dr/dt-dy/dt of the externally input vibration is equal to or less than a previously set very small amount; and operation control means for controlling the operation of the actuator on the basis of the control input u calculated by the control input calculation means;

wherein the delay-approximated model M is designed such that the delay compensation element R* acts on the speed dr/dt-dy/dt, its output is multiplied by the control input u, and the delay element R acts on the result of the multiplication.

2. A damping force controller according to claim 1, wherein the control input u is a variable damping coefficient $C_v$, which represents a gradient of change in the magnitude of a variable portion of the damping force with speed dr/dt-dy/dt of the externally input vibration.

3. A damping force controller according to claim 1 or 2, wherein the delay element R is a first-order delay element represented by the following equation 1, and the delay compensation element R* is represented by the following equation 2:

$$R = \frac{1}{\tau s + 1} \quad \text{(eq. 1)}$$

$$R^* = \tau s + 1 \quad \text{(eq. 2)}$$

wherein $\tau$ represents a time constant; and s represents a Laplace operator.

4. A damping force controller according to claim 2, wherein the damping force generation apparatus is a suspension apparatus which is disposed between a sprung member and an unsprung member of a vehicle, and which includes a damper for damping vibration of the sprung member in relation to the unsprung member, and an elastic member for absorbing the vibration, wherein the damping force controller variably controls the damping force characteristic of the damper by operating the actuator on the basis of the control input u calculated by the state feedback controller K, to thereby control the damping force of the damping force generation apparatus such that the vibration of the sprung member is restrained.

5. A damping force controller according to claim 4, wherein the state space representation of the delay-approximated model M is expressed by the following equation 3:

$$\begin{bmatrix} \ddot{r} - \ddot{y} \\ \dddot{y} \\ \dot{x}_\tau \end{bmatrix} = \begin{bmatrix} 0 & -1 & 0 \\ K_s/M & -C_s/M & 1/M \\ 0 & 0 & -1/\tau \end{bmatrix} \begin{bmatrix} r - y \\ \dot{y} \\ x_\tau \end{bmatrix} + \begin{bmatrix} 1 \\ C_s/M \\ 0 \end{bmatrix} \dot{r} + \begin{bmatrix} 0 \\ 0 \\ \{\tau(\ddot{r} - \ddot{y}) + (\dot{r} - \dot{y})\}/\tau \end{bmatrix} u \quad \text{(eq. 3)}$$

wherein
$\dot{r}-\dot{y}$ represents sprung—unsprung relative speed; $\ddot{y}$ represents sprung member acceleration; $\dot{x}_\tau$ represents the differentiated value of variable damping force;
r-y represents sprung—unsprung relative displacement; $\dot{y}$ represents sprung member speed; $x_\tau$ represents the variable damping force $\ddot{r}-\ddot{y}$ represents sprung—unsprung relative acceleration; $\dot{r}$ represents unsprung member speed; u represents the control input; $K_s$ represents the elastic coefficient of the elastic member; M represents the mass of the sprung member; $C_s$ represents a linear damping coefficient; and $\tau$ represents a time constant.

6. A damping force control method for controlling damping force generated by a damping force generation apparatus against externally input vibration by operating an actuator, the method comprising the steps of:

designing, using a control unit, a state feedback controller K such that an L2 gain of a closed loop control system S including a generalized plant G and the state feedback controller K for the generalized plant G becomes less than a previously set positive constant $\gamma$, the generalized plant G being designed by making use of a delay-approximated model M which is a control model in which a delay element R representing operation delay of the actuator and a delay compensation element R* cancelling out the delay act on a mechanical motion model of the damping force generation apparatus, which is a bilinear system, and which is designed to approximate a control model designed on the basis of the mechanical motion model of the damping force generation apparatus and in consideration of the delay, when a change amount of the speed dr/dt-dy/dt of the externally input vibration is equal to or less than a previously set very small amount;

calculating a control input u by use of the designed state feedback controller K; and operating the actuator on the basis of the calculated control input u;

wherein the delay-approximated model M is designed such that the delay compensation element R* acts on the speed dr/dt-dy/dt, its output is multiplied by the control input u, and the delay element R acts on the result of the multiplication.

7. A damping force control method according to claim 6, wherein the control input u is a variable damping coefficient $C_v$, which represents a gradient of change in the magnitude of a variable portion of the damping force with speed dr/dt-dy/dt of the externally input vibration.

\* \* \* \* \*